US008683779B2

(12) United States Patent
Duenwald et al.

(10) Patent No.: US 8,683,779 B2
(45) Date of Patent: Apr. 1, 2014

(54) AGRICULTURAL PISTON BALE PRESS

(71) Applicant: Forage Innovations B.V., Maassluis (NL)

(72) Inventors: Tom Duenwald, Pella, IA (US); Willem Jacobus Reijersen Van Buuren, Dirksland (NL); Thomas Bergmann, Neustadt/Sachsen (DE)

(73) Assignee: Forage Innovations B.V., Maassluis (NL)

( * ) Notice: Subject to any disclaimer, the term of this patent is extended or adjusted under 35 U.S.C. 154(b) by 0 days.

(21) Appl. No.: 13/721,067

(22) Filed: Dec. 20, 2012

(65) Prior Publication Data

US 2013/0104512 A1    May 2, 2013

Related U.S. Application Data

(63) Continuation of application No. PCT/NL2011/000048, filed on Jun. 15, 2011.

(60) Provisional application No. 61/357,159, filed on Jun. 22, 2010.

(51) Int. Cl.
*A01D 39/00* (2006.01)
*A01D 43/02* (2006.01)
*A01D 75/00* (2006.01)

(52) U.S. Cl.
USPC ............................................. 56/341; 100/88

(58) Field of Classification Search
USPC .................... 56/341; 100/88, 189, 295, 100
See application file for complete search history.

(56) References Cited

U.S. PATENT DOCUMENTS

| 2,409,478 | A | * | 10/1946 | Dickow | 100/142 |
| 3,938,652 | A | * | 2/1976 | Sacht et al. | 198/507 |
| 4,106,268 | A | | 8/1978 | White et al. | |
| 4,118,918 | A | * | 10/1978 | White | 56/341 |
| 4,514,968 | A | * | 5/1985 | Underhill | 56/341 |
| 4,524,574 | A | * | 6/1985 | Ratzlaff | 56/341 |
| 4,569,282 | A | * | 2/1986 | Galant | 100/189 |
| 4,644,862 | A | | 2/1987 | Young | |

(Continued)

FOREIGN PATENT DOCUMENTS

| EP | 0870425 A1 | 10/1998 |
| EP | 1769674 A1 | 4/2007 |
| FR | 1185953 A | 8/1959 |
| WO | 02074065 A1 | 9/2002 |

OTHER PUBLICATIONS

International Search Report issued on Sep. 8, 2011.

*Primary Examiner* — Árpád Fábián-Kovács
(74) *Attorney, Agent, or Firm* — Hoyng Monegier LLP; Coraline J. Haitjema; David P. Owen

(57) ABSTRACT

An agricultural piston bale press includes a pressing piston, a main driving mechanism, an intake device to take in crop material, and a stuffing device. The stuffing device includes a feed passage and a stuffing mechanism that has a tine arm supporting tines that can be moved along a stuffing trajectory, and a drive mechanism for driving the tine arm. The drive mechanism is configured to move the tine arm in a cyclic movement along a constant trajectory, and that the tines are movably supported on the tine arm so that the tines can be arranged in different positions with respect to the tine arm to follow different trajectories.

19 Claims, 18 Drawing Sheets

(56) References Cited

U.S. PATENT DOCUMENTS

| | | | |
|---|---|---|---|
| 4,656,938 A * | 4/1987 | Webb et al. | 100/189 |
| 4,825,760 A * | 5/1989 | Weddeling | 100/188 R |
| 4,862,797 A * | 9/1989 | Mathis | 100/189 |
| 5,467,702 A * | 11/1995 | Naaktgeboren et al. | 100/35 |
| 5,819,515 A * | 10/1998 | Ratzlaff et al. | 56/341 |
| 5,842,335 A * | 12/1998 | Esau | 56/341 |
| 5,894,718 A * | 4/1999 | Hawlas et al. | 56/341 |
| 5,950,410 A * | 9/1999 | O'Brien et al. | 56/341 |
| 6,029,434 A * | 2/2000 | Ratzlaff et al. | 56/341 |
| 6,050,074 A | 4/2000 | Clostermeyer | |
| 6,070,403 A * | 6/2000 | Hawlas | 56/341 |
| 6,298,646 B1 * | 10/2001 | Schrag et al. | 56/341 |
| 6,425,234 B1 * | 7/2002 | Krone et al. | 56/341 |
| 6,557,336 B2 * | 5/2003 | Lucand et al. | 56/341 |
| 6,595,123 B2 * | 7/2003 | Schrag et al. | 100/97 |
| 6,647,706 B2 | 11/2003 | Vogt et al. | |
| 6,679,042 B1 * | 1/2004 | Schrag et al. | 56/341 |
| 6,862,876 B2 * | 3/2005 | Amstel Van et al. | 56/341 |
| 7,047,719 B2 * | 5/2006 | Dubois | 56/341 |
| 2002/0174781 A1 * | 11/2002 | Leupe et al. | 100/88 |

* cited by examiner

AGRICULTURAL PISTON BALE PRESS

CROSS REFERENCE TO RELATED APPLICATIONS

This application is a continuation of PCT application number PCT/NL2011/000048 filed on 15 Jun. 2011, which claims priority from U.S. application No. 61/357,159 filed on 22 Jun. 2010. Both applications are hereby incorporated by reference in their entireties.

BACKGROUND OF THE INVENTION

1. Field of the Invention

The invention relates generally to a piston bale press for forming rectangular bales of crop material.

2. Description of the Related Art

Such piston bale presses are for instance disclosed in WO 02/074065, EP 0870 425, and U.S. Pat. No. 6,647,706, which are incorporated by reference in their entireties.

A known embodiment of an agricultural piston bale press comprises a pressing piston arranged in a bale chamber to form bales of crop material, a main driving mechanism to drive the pressing piston; an intake device to take in crop material, and a stuffing device to stuff crop material taken in by the intake device and to load the stuffed crop material into the bale chamber. The stuffing device comprises a feed passage and a stuffing mechanism. The stuffing mechanism comprises a tine arm supporting tines and a drive mechanism. The drive mechanism is configured to move the tine arm along a stuffing trajectory to stuff crop material in the feed passage.

A drawback of the known bale press is that the selective movement of the tine arm along a load trajectory and one or more stuffing trajectories requires a relative complex drive mechanism.

BRIEF SUMMARY OF THE INVENTION

It is an aim of the invention to provide an agricultural piston bale press having a tine arm drive mechanism having a relative simple design or at least to provide an alternative stuffing mechanism for an agricultural piston bale press.

The present invention provides an agricultural piston bale press, comprising:
a pressing piston arranged in a bale chamber to form bales of crop material;
a main drive mechanism to drive the pressing piston;
an intake device to take in crop material, and
a stuffing device to stuff crop material taken in by the intake device and to load the stuffed crop material to the bale chamber,
wherein the stuffing device comprises a feed passage and a stuffing mechanism, the stuffing mechanism comprising a tine arm supporting tines, which tines can be moved along at least one stuffing trajectory to stuff crop material in the feed passage, and a drive mechanism to drive the tine arm, characterized in that the drive mechanism is configured to move the tine arm in a cyclic movement along a constant trajectory, and that the tines are movably supported on the tine arm so that the tines can be arranged in different positions with respect to the tine arm to follow different trajectories.

According to the invention the tine arm is, during stuffing of crop material, moved along the same path of movement. Therefore, a relative simple driving mechanism may be used for the movement of the tine arm. The tines are movably supported on the tine arm. By movement of the tines with respect to the tine arm, the tines can be positioned in different positions with respect to the tine arm. Dependent on the position of the tines with respect to the tine arm during the cyclic movement the tines will be moved along a trajectory, for instance a stuffing trajectory.

In an embodiment, the tines can be arranged in one or more positions to follow a stuffing trajectory and/or in one or more positions to follow a load trajectory to load stuffed crop material from the feed passage into the bale chamber. In such embodiment, the stuffing device can also be used as a loading device to load stuffed crop material from the feed passage into the bale chamber when sufficient crop material is loaded and compressed in the feed passage. During stuffing or loading of crop material, the tine arm is still moved along the same trajectory. Positioning of the tines with respect to the tine arm, results in the tines following a load trajectory or a stuffing trajectory. Alternatively, a separate loading device could be also used instead of the one combined stuffing and loading device.

In an embodiment, the cyclic movement along the constant trajectory is a continuous movement. A continuous movement, i.e. a movement wherein the tine arm does not stop for instance to change direction of movement, may improve reliability of the movement of the tine arm, since wear of the parts of the stuffing mechanism may be decreased when using a continuous movement.

In an embodiment, the tine arm is pivotable about a first pivot axis, which first pivot axis is mounted on a rotation element, the rotation element being rotatable about a second pivot axis mounted on the frame. With such mechanism a continuous cyclic movement of the tine arm along a constant trajectory can be obtained with a relative simple construction.

To obtain the cyclic movement of the tine arm along a constant trajectory, the drive mechanism may comprise a crank mechanism connected to the tine arm to pivot the tine arm on the first pivot axis and a rotation device to rotate the rotation element, and therewith the first pivot axis about the second pivot axis. In an alternative embodiment the rotation element may be rotated by the movement caused by the crank mechanism.

Any other mechanism may also be used in order to move the tine arm in the cyclic movement along a constant trajectory.

In an embodiment, at least one overload clutch is arranged in the drive mechanism of the tine arm. By arranging an overload clutch in the drive mechanism damage to the stuffing mechanism may be avoided, for instance when the feed passage is completely obstructed and the tines get stuck in the crop material.

In an embodiment, the tines can be arranged in different stuffing positions with respect to the tine arm to move the tines along the stuffing trajectory. During a stuffing trajectory the tines will be moved from an extended position, wherein the tines are arranged in the feed passage to a retracted position wherein the tines are at least partially taken out of the feed passage. In the extended position crop material can be stuffed in the feed passage. The retracted position makes it possible to move the tines past the crop material already present in the feed passage to complete the constant cycle of the tine arm.

In an embodiment, the tines can be positioned in a stationary loading position with respect to the tine arm to move the tines along the load trajectory. In this loading position the tines extend into the feed passage so that during the load trajectory the crop material present in the feed passage is fed into the bale chamber. Preferably, the loading position is an extended position of the tines with respect to the tine arm.

In an embodiment, the stuffing mechanism comprises a tine locking device, for instance a brake, wherein the tine locking device has a locked position to lock the tine in the loading position and an unlocked position wherein the tine is freely movable with respect to the tine arm. When the tines are locked in the loading position, the tines will be moved along the load trajectory, when the tine arm is moved in the constant cyclic movement.

When the tines are unlocked, the tines can be moved, actively or passively, between different positions, for instance to move the tines along a stuffing trajectory. In an active embodiment, an actuator may be provided to move the tines between different positions with respect to the tine arm. In a passive embodiment, the tines may be moved by external forces between different positions. For instance the stuffed crop material in the feed passage, may be used to move the tine arms from an extended position to a retracted position.

In an embodiment, the stuffing mechanism comprises a biasing element, for instance a spring, arranged between the tine arm and the tines, and/or at least one cam track arranged between the tines and the frame. When the tines are biased in the loading position, the tines will normally be positioned in the loading position and by continuous movement of the tine arm, the tines will be moved along a load trajectory. The tines may be moved out of the feed passage against the force of the biasing element, when an external force is exerted on the tines, for instance by the crop material already present in the feed passage. The tines may also be freely or low spring loaded moved out of the feed passage and returned to the loading position by the cam track or a combination of the cam track and the spring. In this way the tines will automatically follow a stuffing trajectory when crop material is present in the feed passage.

As soon as the tines are locked by the locking device in the loading position, the tines can no longer move with respect to the tine arm. As a result, the tines will follow the load trajectory, thereby moving the stuffed crop material out of the feed passage into the bale chamber.

The moment of locking of the tines in the locking position may be dependent on a mechanical input such as the position where the tines are forced out of the feed passage by the crop material, or another signal, such as force exerted on the crop material in the feed passage. Such force can for example be measured at the tines or at a retaining element arranged at the outlet side of the feed passage to avoid early ejecting of the crop material in the feed passage. The tines can also be locked after a predetermined number of stuffing cycles.

In an embodiment, the tines are pivotably supported on the tine arm. A pivotable movement of the arm is very suitable to be used in the movement of the tines. In particular, it is advantageous when the tines can be pivoted in the feed passage in a direction opposite to the direction of movement of the tines in the feed passage. In such embodiment the force exerted by crop material present in the feed passage can be used to push the tines out of the feed passage during the movement of the tines towards the bale chamber.

In an embodiment, the tines are translatable in a longitudinal direction of the tine arm between at least an extended and a retracted position. Preferably, the tines are moved along the load trajectory when the tines are positioned in the extended position. The tines can be moved along the stuffing trajectory, by retracting the tines at least along a part of the movement from the inlet to the outlet of the feed passage.

In such embodiment the movement of the tines with respect to the tine arm is translational. A translational movement is very reliable, since no pivoting parts are required between the tines and the tine arm. In an embodiment a linear actuator, for instance a hydraulic cylinder may be provided to carry out the translational movement.

In an embodiment, the tines are rotationally mounted on the tine arm, wherein the tines comprise a first set of tine ends extending in a first direction with respect to a mounting location on the tine arm, and a second set of tine ends extending at a different angle, for instance 180 degrees, with respect to the mounting location, wherein the tine ends are alternately used for stuffing and/or loading of crop material.

In an embodiment, the position of the tines with respect to the tine arm is controlled directly or indirectly on the basis of a force exerted on the tines, a position of the tines with respect to the tine arm, a location of the tines on the constant trajectory and/or a pressure exerted on the crop material in the feed passage.

In an embodiment, the stuffing device is capable to move the tines along two or more stuffing trajectories. During stuffing of crop material in the feed passage more and more crop material will be present in the feed passage. It may be desirable that the stuffing trajectory is adapted to the quantity of crop material in the feed passage and/or to certain properties of the crop material such as size of the particles in the crop material, the type of crop material or the moisture content of the crop material. To make this possible the stuffing mechanism may be configured to move the tines along different stuffing trajectories.

This can be realized by moving the tines at different locations within the feed passage from the extended position to a retracted position. The location where retraction of the tines is started, can be predetermined, such as a rotational position of the drive mechanism of the tine arm, or a location in the feed passage, or can be dependent on the actual circumstances, for instance the quantity of crop material in the feed passage or the force/pressure exerted on tines or the retaining element arranged in the feed passage.

In an embodiment, a hydraulic actuator is provided to move the tines with respect to the tine arm. In the case the tines are actively moved, i.e. by use of an actuator, with respect to the tine arm, an actuator is provided to carry out this movement. A hydraulic actuator, for instance a hydraulic cylinder, may advantageously be used for such movement, in particular when a hydraulic pressure source is present on the piston bale press.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
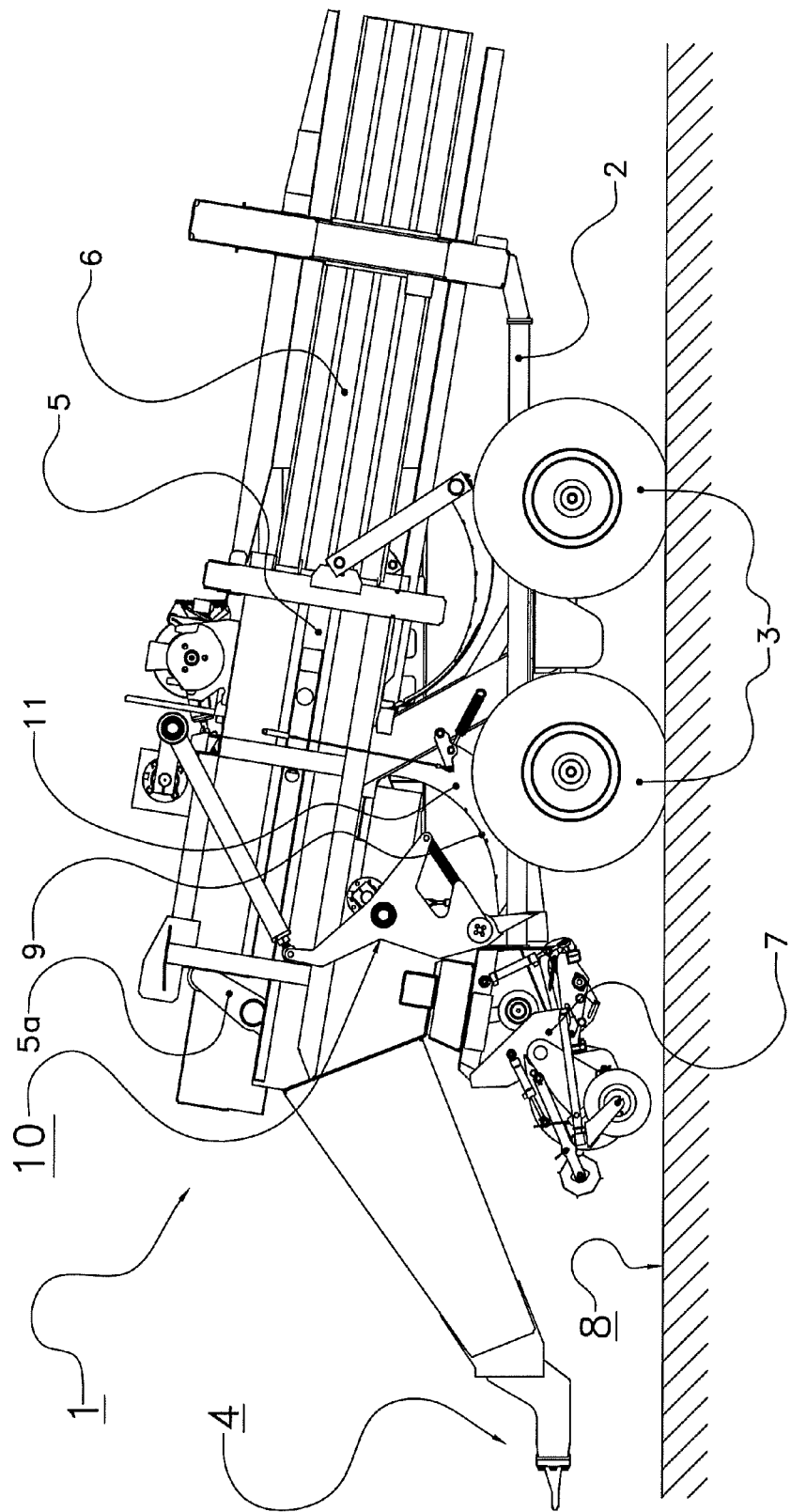
FIG. 1 shows a piston bale press according to the invention.

The following is a description of certain embodiments of the invention, given by way of example only and with reference to the drawings. FIG. 1 shows a side view of a piston bale press, generally denoted with the reference numeral 1. Piston bale presses of this type are generally known and for instance disclosed in EP 1 769 674, EP 0870 425, and U.S. Pat. No. 4,106,268, all of which are incorporated by reference in their entireties.

The piston bale press 1 comprises a frame 2 supported by wheels 3. The piston bale press 1 is configured to be connected at its front end 4 to a pulling vehicle, for instance a tractor. The piston bale press 1 further comprises a piston press 5 configured to press crop material in rectangular bales in a bale chamber 6. A main drive mechanism 5a is provided to move the piston press 5 in an oscillating movement in the bale chamber 6 to compress crop material in the bale chamber 6. The piston bale press 1 further comprises an intake device 7 to take in crop material, i.e. agricultural harvested material, such as silage, grass, hay, or straw from a ground surface 8. To improve the compression of the crop material, a stuffing device 9 is provided to stuff crop material taken in by the intake device 7 in a feed passage 11 before it is loaded in the bale chamber 6. The stuffing device 9 comprises a stuffing mechanism 10 which is configured to stuff crop material in a feed passage 11 to obtain a quantity of crop material with a desired density before the crop material is loaded in the bale chamber 6.

The stuffing mechanism 10 is configured to stuff crop material in the feed passage during a number of stuffing cycles. During each of these stuffing cycles a stuffing trajectory is followed in which crop material is compressed in the feed passage. When sufficient crop material is stuffed in the feed passage 11, the stuffing mechanism will carry out a load cycle in which a load trajectory A is followed to push substantially all crop material present in the feed passage out of the feed passage into the bale chamber 6.

Different embodiments of a stuffing device 9 according to the invention will now be discussed in more detail with reference to FIGS. 2-18.

FIGS. 2-6 show a stuffing device 9 according to a first embodiment of the invention. The stuffing device 9 comprises the feed passage 11 formed between a lower plate 12 and an upper plate 13. An inlet 14 of the feed passage 11 is connected to the intake device 7, and an outlet 15 of the feed passage 11 is connected to the bale chamber 6.

The stuffing mechanism 10 comprises at opposite sides of the piston press 1 tine arm elements connected with each other via a tine cross beam. The tine arm elements constitute a tine arm 16. The tine arm 16 is pivotably supported at pivot axis 17. The pivot axis 17 is mounted on a rotation element 17a which is rotatably mounted on the frame 2 at pivot axis 2a.

A crank mechanism 18 is provided to drive the tine arm 16 in a pivotable movement with respect to the pivot axis 17, and a rotational drive (not shown) is provided to rotate the rotation element 17a and therewith the pivot axis 17 about the pivot axis 2a. An overload load clutch (not shown) is arranged in the drive mechanism.

Figure 2:
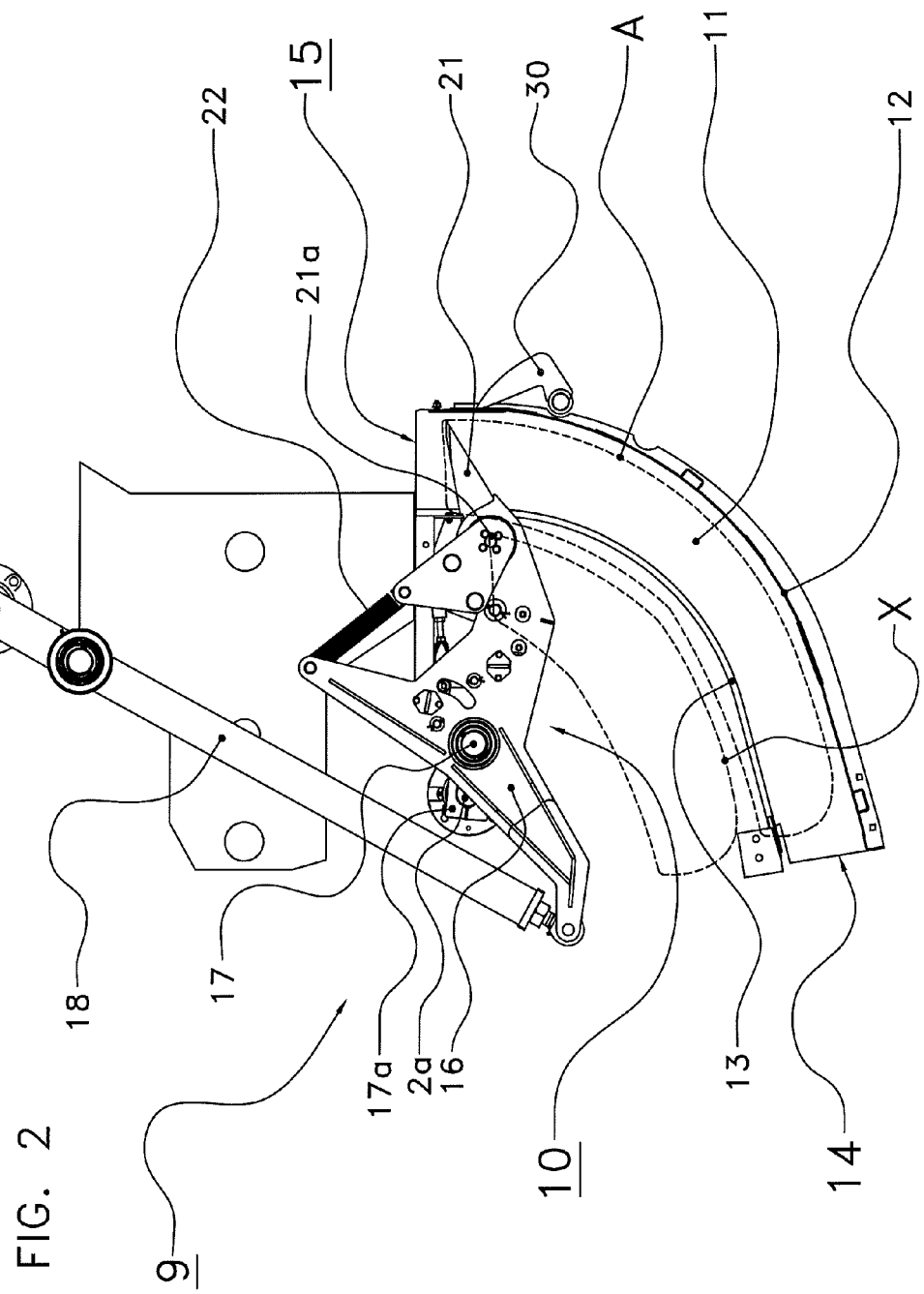
FIG. 2 shows a side view of a stuffing device according to a first embodiment of the invention.
Figure 6:
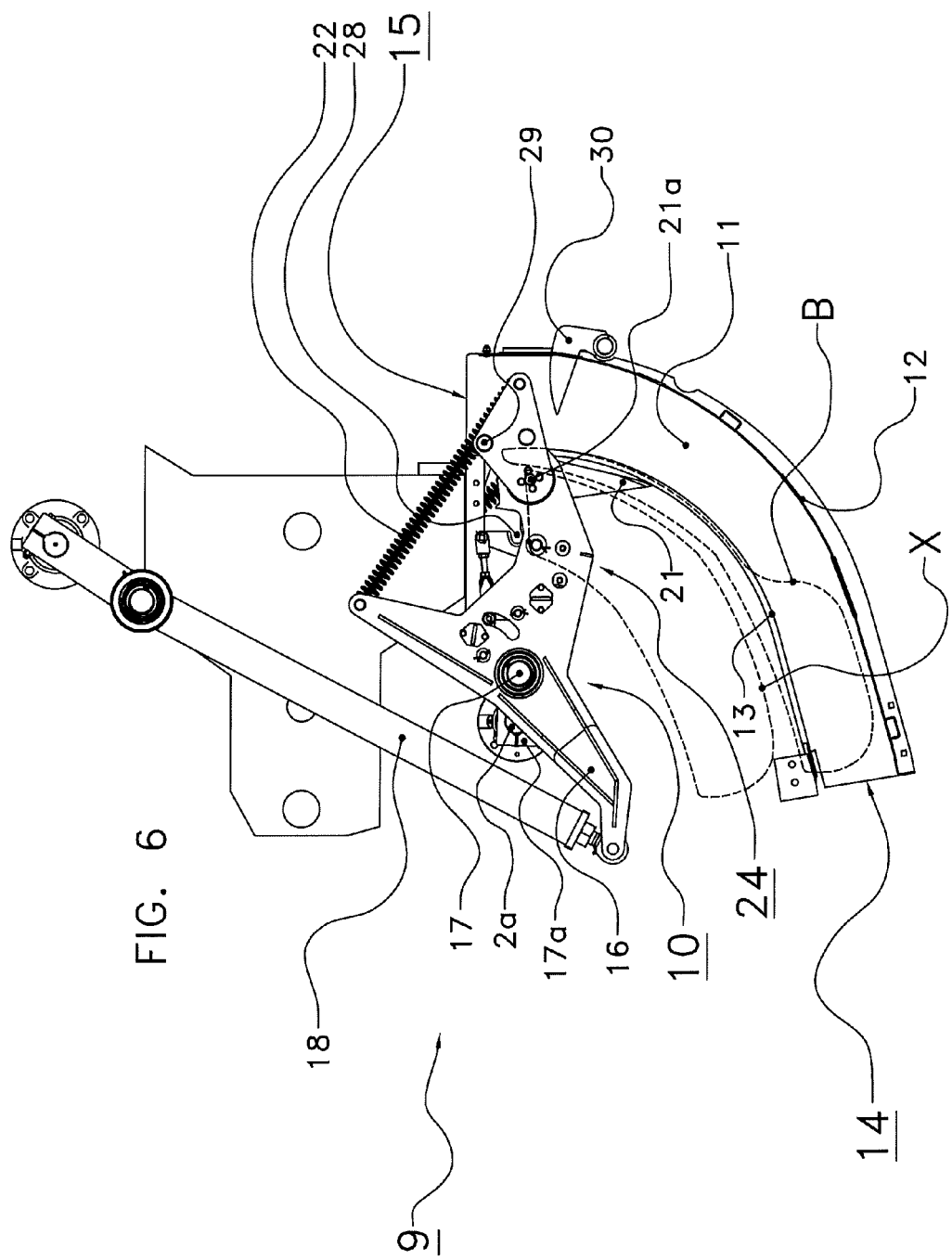

This combined movement results in a constant cyclic trajectory X of the tine arm 16, that remains the same for stuffing trajectories B, see FIG. 6 and the load trajectory A, see FIG. 2. Furthermore, the movement along this trajectory is continuous. The term continuous is used to indicate that during the cyclic movement the tine arm does not stop at a certain position, for instance to change the driving direction.

Figure 3:
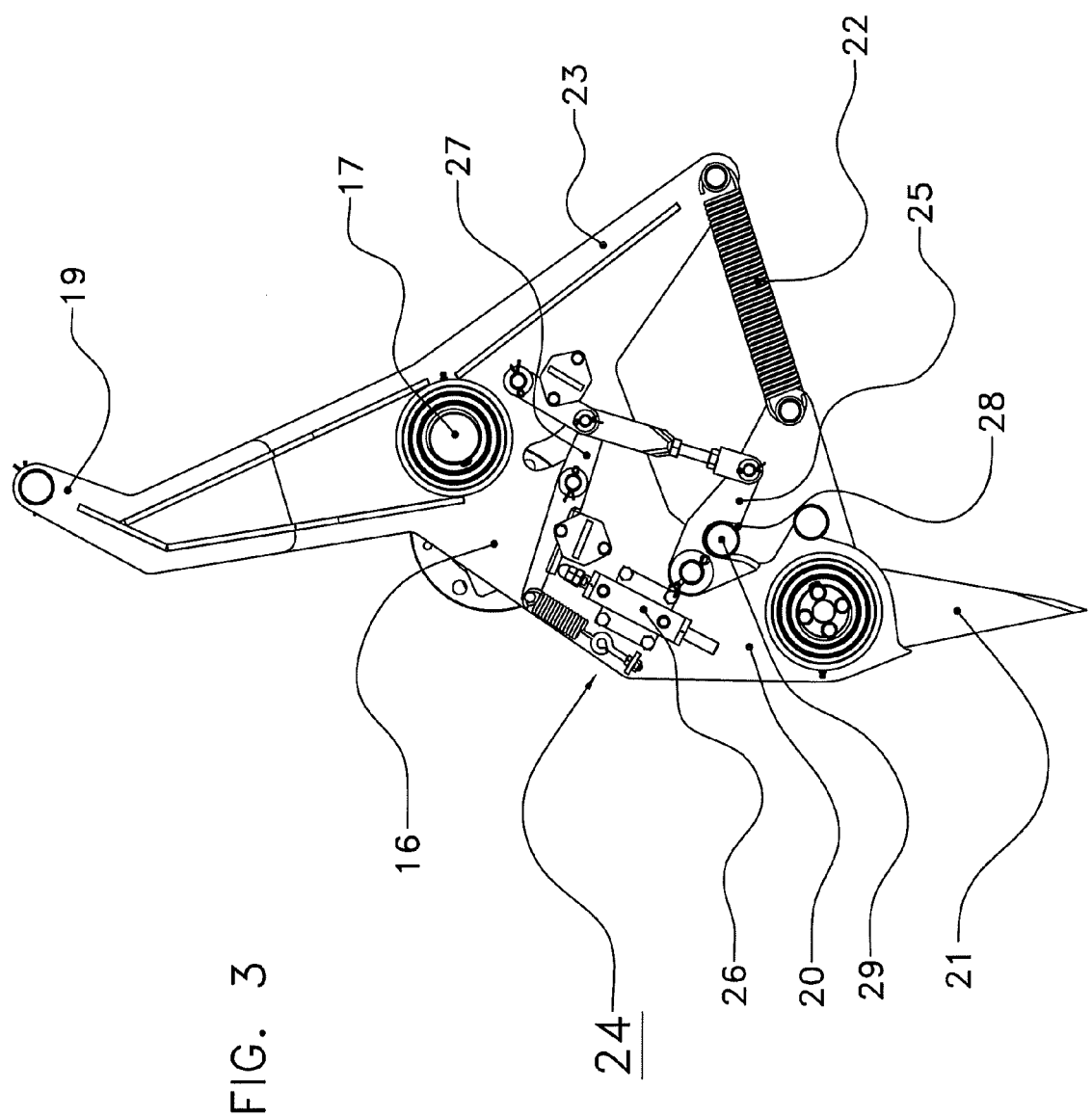
FIG. 3 shows the tine arm of FIG. 2 in more detail.

FIG. 3 shows the tine arm 16 in more detail. A first end 19 of the tine arm is connected to the crank mechanism 18 to move the tine arm 16 in the constant cyclic movement. A second end 20 of the tine arm 16 pivotably supports tines 21 (In FIG. 3 only one tine 21 is shown; in practice multiple tines are provided in the direction perpendicular to the plane of the drawing to cover the width of the feed passage).

Figure 4:
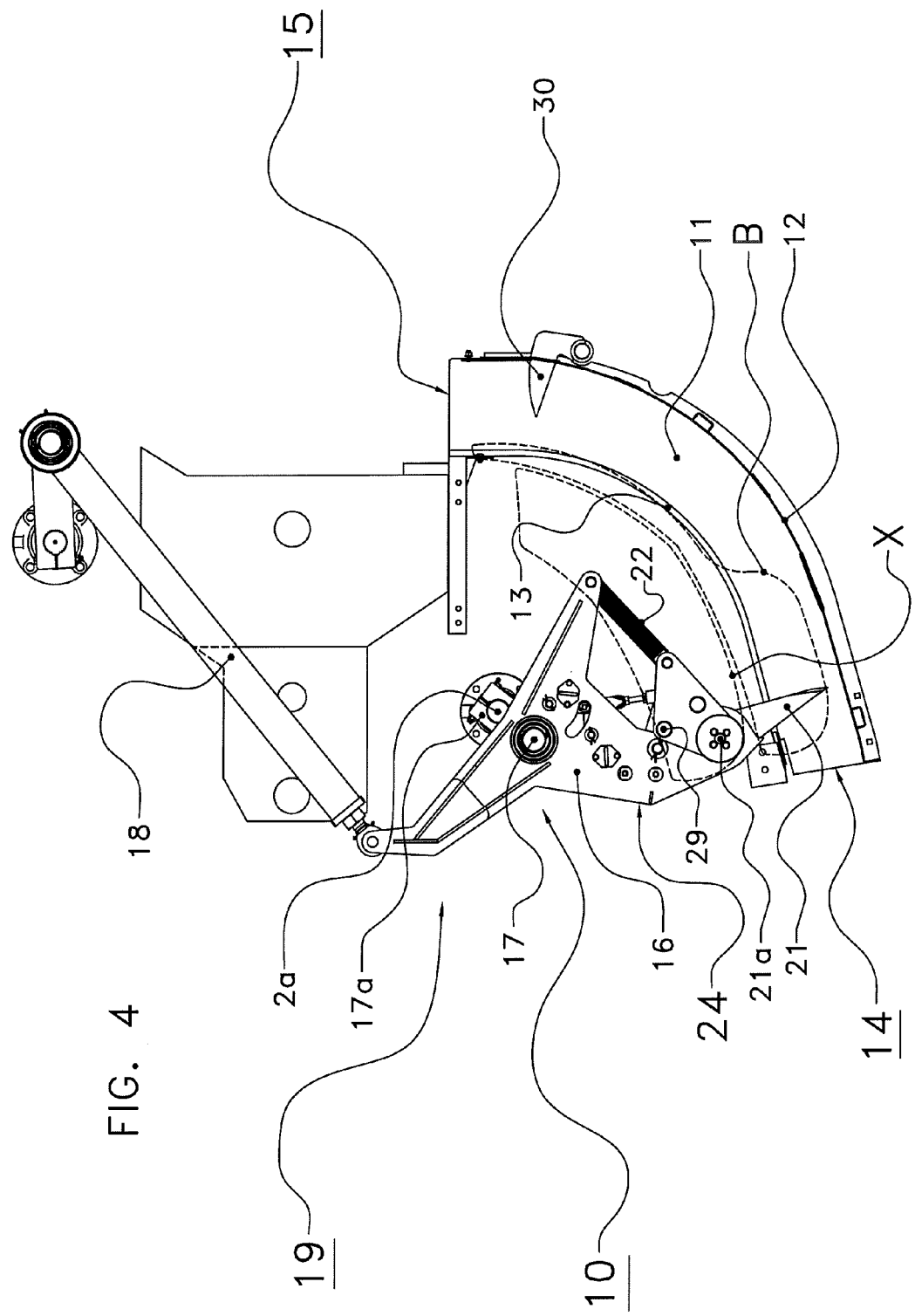
FIGS. 4-6 show further side views of the embodiment of FIG. 2.
Figure 5:
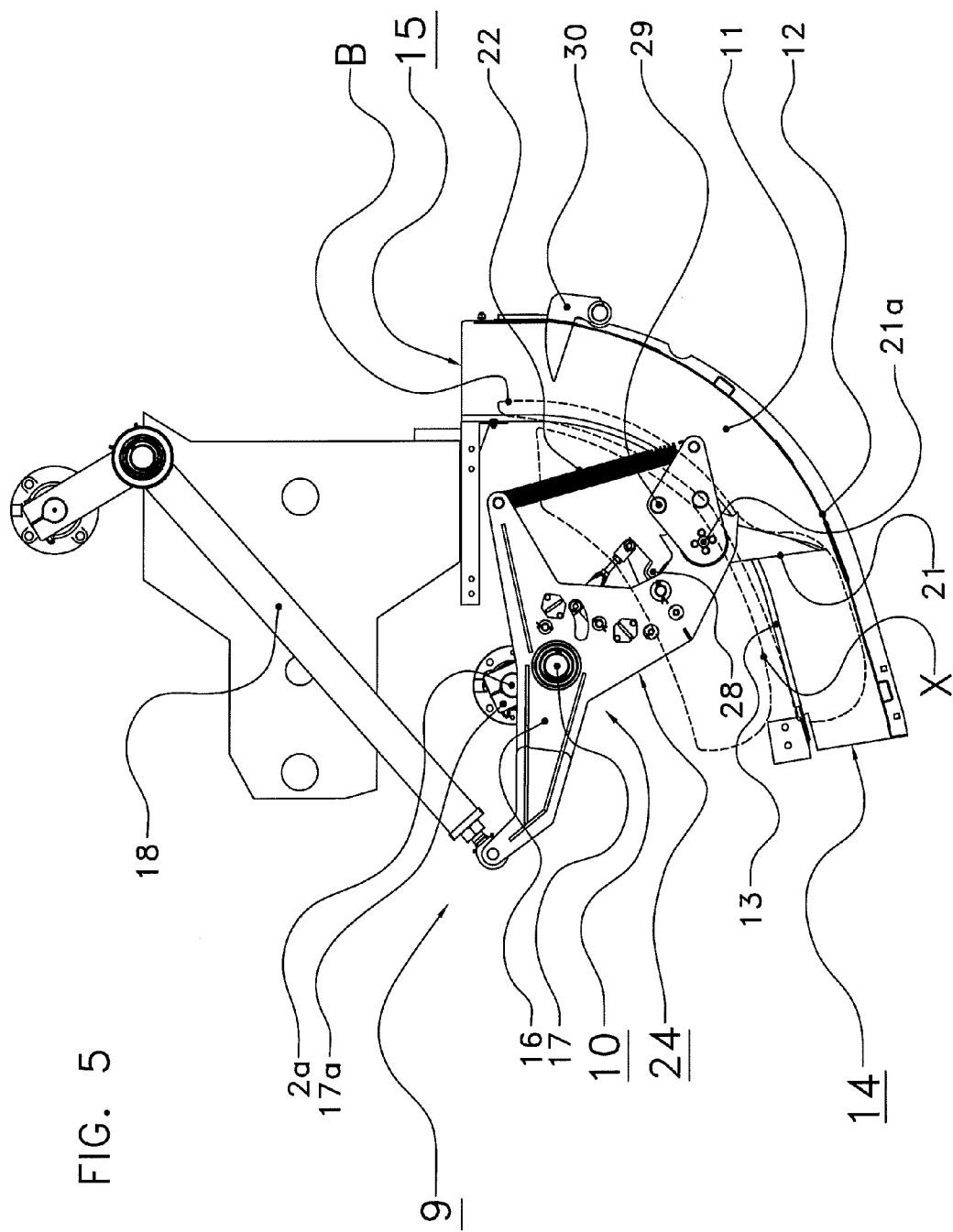

The tines 21 are at least movable between an extended position, as shown in FIGS. 2, 3 and 4, and a retracted position, as shown in FIGS. 5 and 6. In the extended position the tines 21 are pivoted in a position in which the tines extend radially with respect to the pivotal movement of the tine arm. In this embodiment, the extended position is also the loading position. In the extended position the tines 21 will follow a load trajectory A when the tine arm 16 is moved along its constant cyclic trajectory X, as shown in FIG. 2. X shows the trajectory of the tine pivot 21a located on the tine arm 16.

The tines 21 are freely movable between the extended position and the retracted position(s). A spring 22 is provided between a side arm 23 of the tine arm and the tines 21 to bias the tines 21 in the extended position.

A tine locking device 24 is provided to lock the tines 21 in the extended position. The tine locking device 24 comprises a locking arm 25, pivotably mounted on the tine arm 16, a locking actuator 26, and a locking mechanism 27 between the locking actuator 26 and the locking arm 25. The locking arm 25 comprises a recess 28 arranged to receive a pin 29 mounted on the tines 21.

In FIG. 3 the tines are shown in the locked position, wherein the pin 29 is located in the recess 28, thereby locking the tines 21 in a locking position. By actuation of the actuator 26, the locking mechanism 27 will pivot locking arm 25 in a pivotal movement so that the pin 29 is no longer located in the recess 28. In this unlocked position, the tines are free to move from the extended position to a retracted position. However, the spring 22 will still hold the tines 21 in the extended position as long as no other force is exerted on the tines 21.

To move the tines 21 along a stuffing trajectory, the tines 21 can be moved from the loading position to one or more stuffing position wherein the tines 21 are pivoted to a retracted position with respect to the loading position. In this retracted position, the tines 21 will be at least partially moved out of the feed passage 11. During a stuffing trajectory the tines will at the beginning of the feed passage 11 be arranged in the extended position so that crop material will be pushed into the feed passage 11.

A retaining element 30 is arranged in the feed passage 11 close to the outlet 15 thereof. The retaining element 30 is provided to hold crop material within the feed passage 11 during the stuffing cycles. The retaining element 30 is pivotably mounted and movable between an open position as shown in FIG. 2, and a retaining position as shown in FIG. 4. In the retaining position the retaining element 30 obstructs the outlet 15 of the feed passage 11 so that crop material in the feed passage will not be pressed out of the feed passage 11 during stuffing cycles. When the crop material should be loaded in the bale chamber 6, for instance when sufficient crop material is gathered in the feed passage 11, the retaining element 30 can be pivoted to the open position so that the tines 21 can push the crop material to the bale chamber 6.

The movement of the retaining element 30 between the open position and the retaining position can be actively or passively controlled. In an active embodiment, a retaining element actuator may be provided to move the retaining element 30 between the retaining position and the open position. The movement of the retaining element 30 from the retaining position to the open position may be controlled, for instance, depending on a position of the tines 21 with respect to the tine arm 16. In a passive embodiment, the force exerted by the tines 21, via the crop material, on the retaining element 30 may push the retaining element 30 to the open position, when this force exerts a threshold, for instance caused by a biasing element. The biasing element may bring the retaining element 30 back to the retaining position once the force decreases below the threshold.

Now, reference is made to FIG. 4-6 to describe the stuffing trajectory. In use, crop material will enter the feed passage 11 via inlet 14. The tines 21 will be moved along a stuffing trajectory B to stuff, i.e. pre-compress, crop material in the feed passage 11. The retaining element 30 is positioned in the retaining position to keep the crop material within the feed passage 11.

In FIG. 4, the tines 21 are shown at the beginning of feed passage 11, where the tines 21 are arranged in the extended position. The tine locking device 24 is positioned in the locked position, wherein the pin 29 is held in the recess 28. The tines 21 extend in the feed passage 11 so that crop material is moved towards the outlet 15.

At some location in the feed passage 11 the tines 21 should be moved out of the feed passage 11 to avoid that the force on the crop material becomes too large and/or that crop material is too early loaded in the bale chamber 6. In the shown embodiment the pivotal movement of the tines is caused by crop material present in the feed passage 11. To make the pivotal movement of the tines 21 possible the tine locking device 24 should be arranged in the unlocked position as shown in FIG. 5 by actuation of the locking actuator 26.

As shown in FIGS. 5 and 6, when the tines 21 are in the unlocked position and the tines 21 are moved further towards the outlet of the feed passage 11, the tines will be pushed by crop material in retracted positions wherein the tines 21 are moved substantially out of the feed passage 11. Due to the pivotal movement of the tines the spring 22 is extended, as clearly is shown in FIG. 6.

It will be clear that, in the embodiment of FIGS. 2-6, the location where the tines 21 will be moved out of the feed passage is dependent on the quantity of crop material in the feed passage 11. Normally, in subsequent stuffing cycles this location will move towards the inlet 14 of the feed passage, since more and more crop material will be present in the feed passage 11.

In the return movement of the stuffing cycle, i.e. from a location near the outlet 15 towards the inlet 14, the crop material will no longer exert a force on the tines 21 and due to the spring force of the spring 22 the tines 21 will move back to the extended position. In this extended position, the tines may start one or more further stuffing cycles to stuff more crop material in the feed passage 11 until sufficient crop material has been gathered in the feed passage 11. It is remarked that at the beginning of these stuffing cycles the tines do not have to be locked by the tine locking device 24 in the extended position, since the spring 22 will hold the tines 21 in this extended position.

Once sufficient crop material is present in the feed passage 11, the crop material can be loaded in the bale chamber 6 by performing a load cycle, i.e. the tines 21 will follow a load trajectory A as shown in FIG. 2. To carry out a load cycle, the tines 21 are locked by the tine locking device 24 in the extended or loading position for a complete cycle of the tine arm 16. As a consequence, the crop material present in the feed passage 11 will be pushed into the bale chamber 6 for the formation of a rectangular bale in this bale chamber 6.

The moment of locking the pin 29 in the recess 28 for a complete cycle of the tine arm 16 may be dependent on the force or pressure exerted on the tines 21 or the retaining element 30. This force is relative for the quantity of crop material in the feed passage and the density thereof.

As an alternative, the location in the stuffing cycle where the tines are moved from the extended position to a retracted position may be used for the decision to activate the tine locking device 24. As explained above, this location will gradually move towards the inlet 14 of the feed passage 11. The tines 21 may be locked to perform a load cycle when this location has reached a certain position with respect to the inlet 14 or another reference point.

The signal for locking of the pin 29 in the recess 28 may also be used as an activation signal for an actuator configured to move the retaining element 30 from the retaining position to the open position.

When the load cycle is finished, the tine locking device 24 is positioned back in the unlocked position so that the tines 21 are free to pivot with respect to the tine arm 16, and the retaining element 30 is moved back to the retaining position. In the unlocked position of the tines 21 one or more stuffing cycles can be made, before another load cycle is performed.

The above-described embodiment should be regarded as an example of a stuffing mechanism comprising movable tines 21 supported on a tine arm 16 configured to make a constant cyclic movement. Many parts could be carried out in an alternative way or may even not be required to carry out the invention.

For instance, as an alternative for the spring 22, any other biasing element may be used. In an alternative embodiment, an active element may be arranged between the tine arm and the tines to move the tines actively between the loading position and one or more retracted positions. In such embodiment, the locking mechanism may be obviated, when the active element in itself can function as a tine locking device.

The tine locking device 24 is an example of a locking mechanism to lock the tines in the extended position. Any alternative embodiment of a locking device capable of locking the tines in the extended position may also be applied. In some embodiments, no separate locking mechanism is required since locking may be performed by other means, for instance an actuator.

FIGS. 7-10 show an alternative embodiment of a stuffing device 9 according to the invention. The same parts or parts having the same function have been indicated by the same reference numerals.

Figure 7:
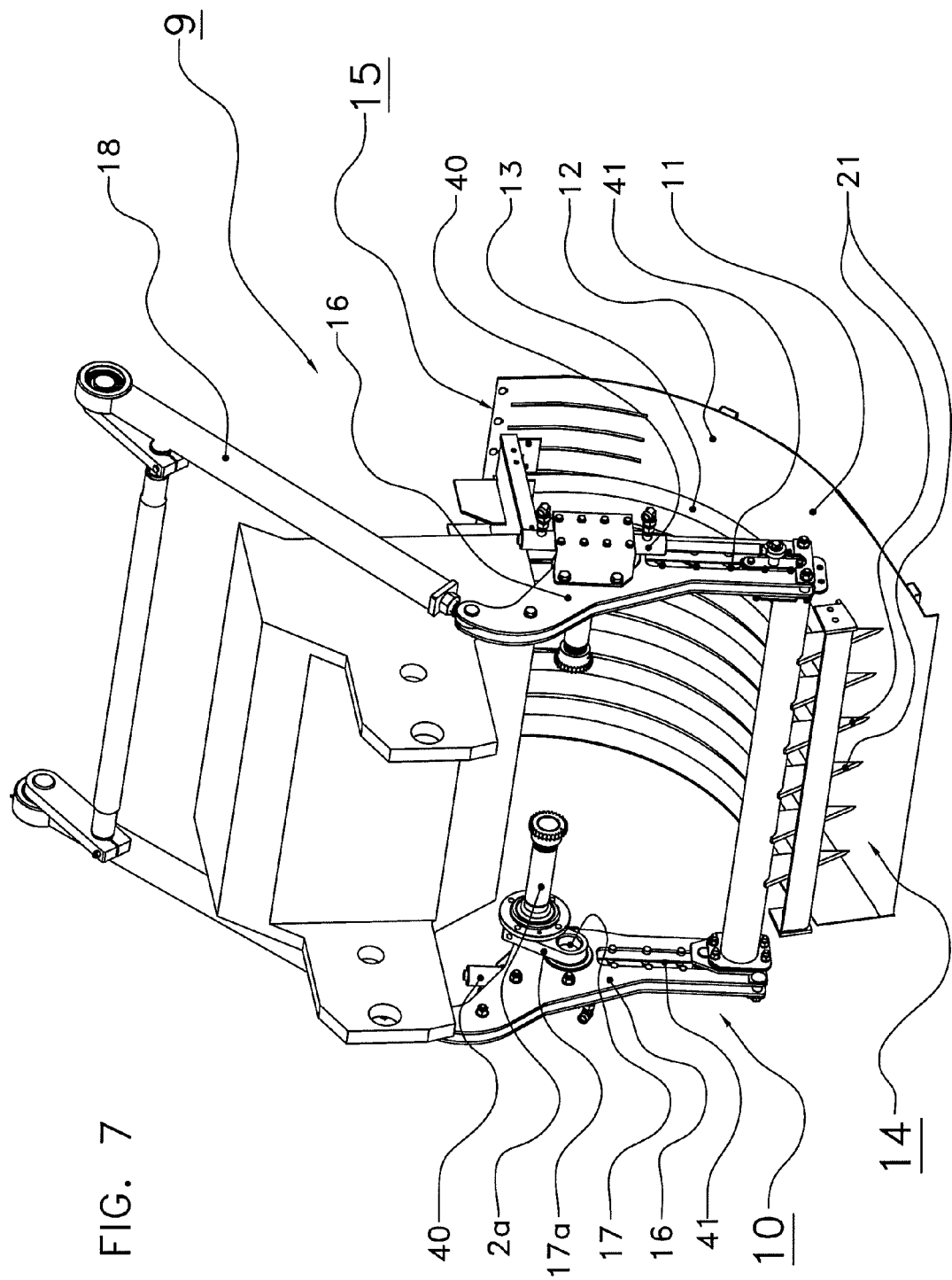
FIG. 7 shows a perspective view of a second embodiment of a stuffing device according to of the invention.
Figure 8:
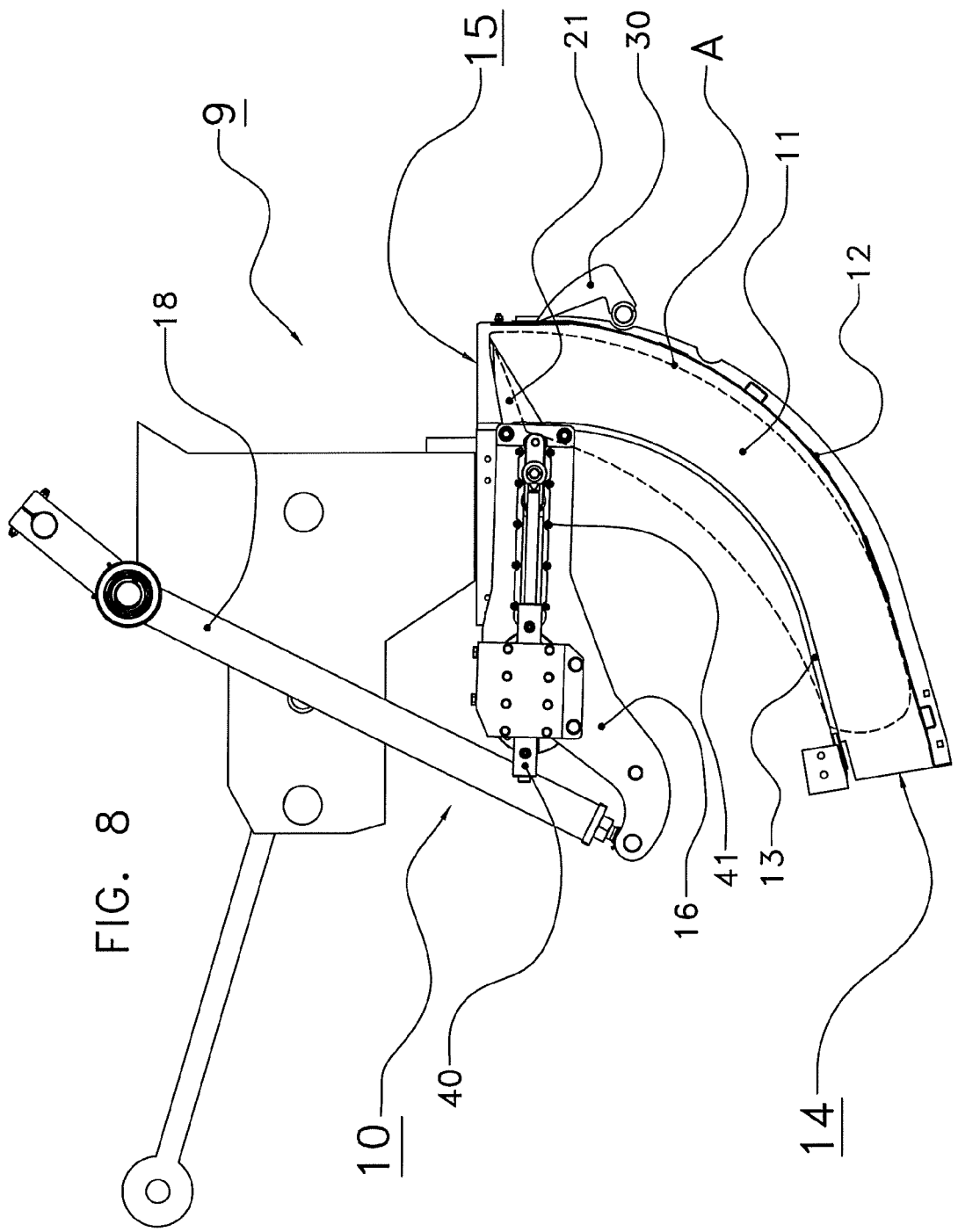
FIGS. 8-10 show in side view the stuffing device of FIG. 7.
Figure 9:
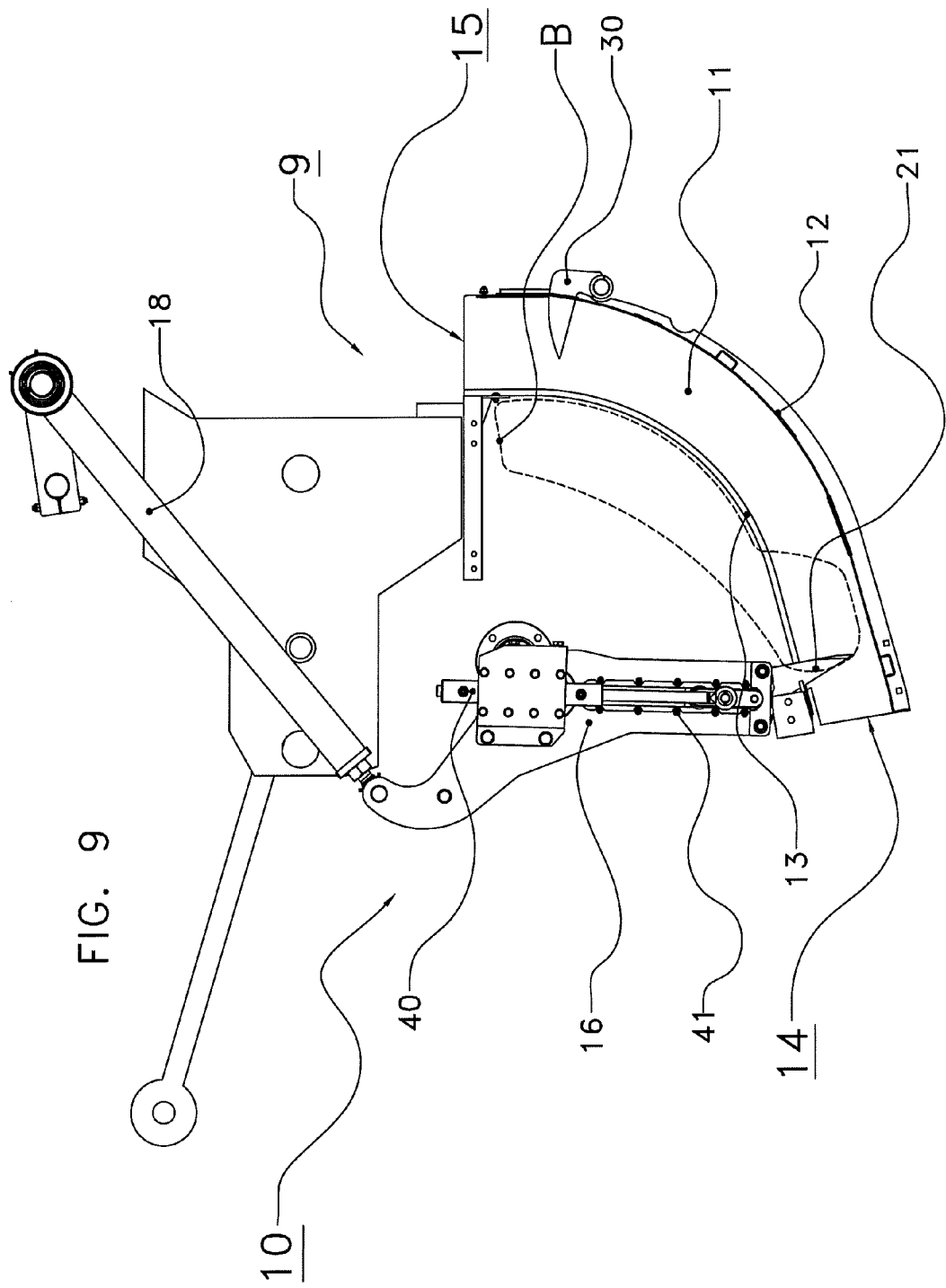
Figure 10:
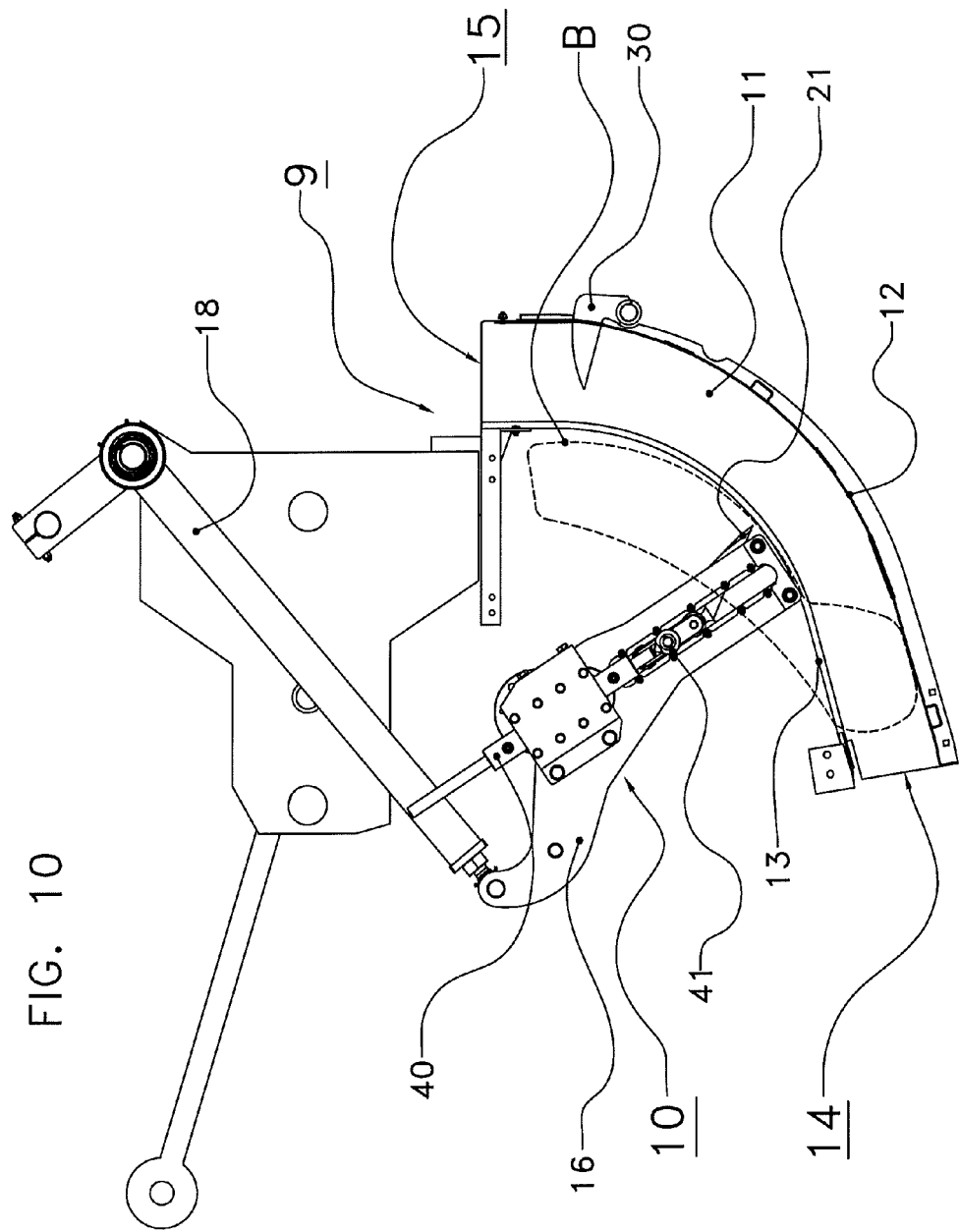

FIG. 7 shows the stuffing device 9 in perspective view. From this view, it is clear that the tine arm 16 is constituted by two tine arm elements connected to each other by a cross beam on which the tines 21 are mounted. FIGS. 8-10 show the stuffing device 9 in side view.

The stuffing device 9 comprises a tine arm 16 arranged to be driven by the crank mechanism 18 in a continuous and constant cyclic movement. Tines 21 are translatable supported on the tine arm 1. The tines 21 are translatable between an extended position, as shown in FIGS. 8 and 9, and a retracted position, as shown in FIG. 10.

A linear actuator 40 is connected to the tines 21 to move the tines 21 between the extended and retracted positions. The linear actuator 40 may for instance be a hydraulic cylinder. A linear guiding device 41 is provided on the tine arm 16 to guide the linear movement of the tines 21.

The advantage of the embodiment of FIGS. 7-10 is that the movement of the tines 16 with respect to the tine arm 16 is linear. A relative simple and reliable actuator can be used to perform this action.

In FIG. 7, a load trajectory A of the tines 21 is shown. During the complete load trajectory A the tines 21 are held in the extended position, and due to the constant cyclic movement of the tine arm 16, the tines 21 are moved along the load trajectory A.

FIGS. 8 and 9 show the stuffing device 9 during a stuffing cycle. In this stuffing cycle the tines 21 follow the stuffing trajectory B.

In FIG. 8, the tines 21 are shown at the beginning of feed passage 11, and the tines 21 are arranged in the extended position. The retaining element 30 is positioned in the retaining position. At some location in the feed passage 11 the tines 21 are substantially moved out of the feed passage 11 to avoid that the force on the crop material becomes too large and/or that crop material is too early loaded in the bale chamber 6. At this location, the linear actuator 40 is activated to move the tines 21 to the retracted position.

FIG. 10 shows the tines 21 in the retracted position. The tines 21 are held in the retracted position during the movement of the tines 21 towards the outlet 15. During the return movement of the tines towards the inlet 14 of the feed passage 11 to begin a new stuffing cycle or a load cycle, the tines are brought back to the extended position.

In this extended position, the tines 21 may start one or more further stuffing cycles to stuff crop material in the feed passage 11 until sufficient crop material has been gathered in the feed passage 11. The stuffing cycles may all follow the same trajectory, for instance stuffing trajectory B shown in FIGS. 9 and 10, or the stuffing cycles may follow different stuffing trajectories, for instance dependent on the quantity of crop material already gathered in the feed passage 11.

Once sufficient crop material is present in the feed passage 11, the crop material can be loaded in the bale chamber 6 by performing a load cycle, i.e. the tines 21 will follow a load trajectory A as shown in FIG. 8. To carry out a load cycle, the tines 21 are kept in the extended position for a complete cycle of the tine arm 16.

The moment of carrying out a complete load cycle may be dependent on the force or pressure exerted on the tines 21 or the retaining element 30, or any other reason, for instance the number of subsequent stuffing cycles. The force or pressure is relative for the quantity of crop material in the feed passage and the density thereof. When the load cycle is finished, one or more stuffing cycles can be made, before another load cycle is performed.

Figure 11:
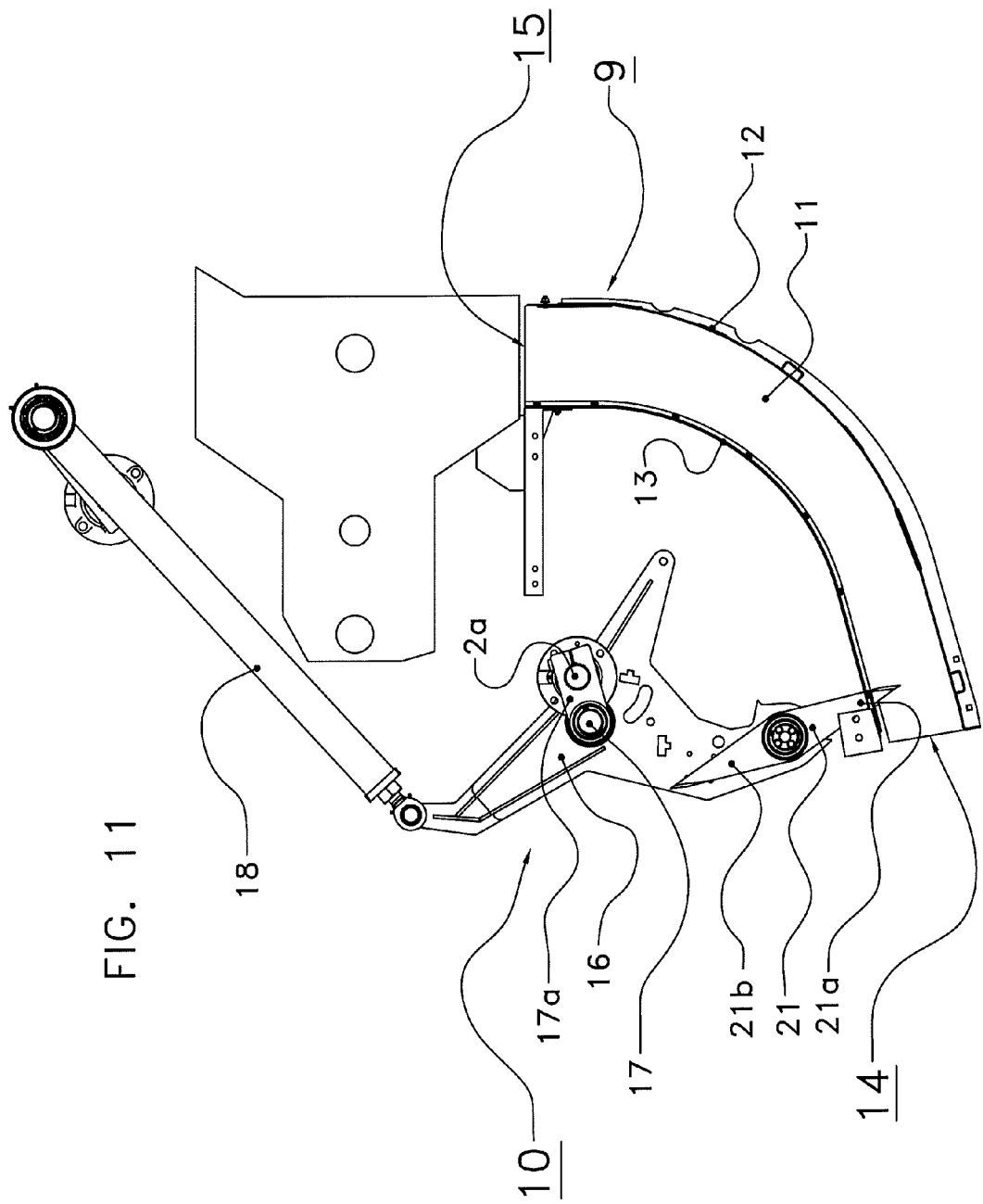
FIGS. 11 and 12 show in side view a third embodiment of a stuffing device according to the invention.
Figure 12:
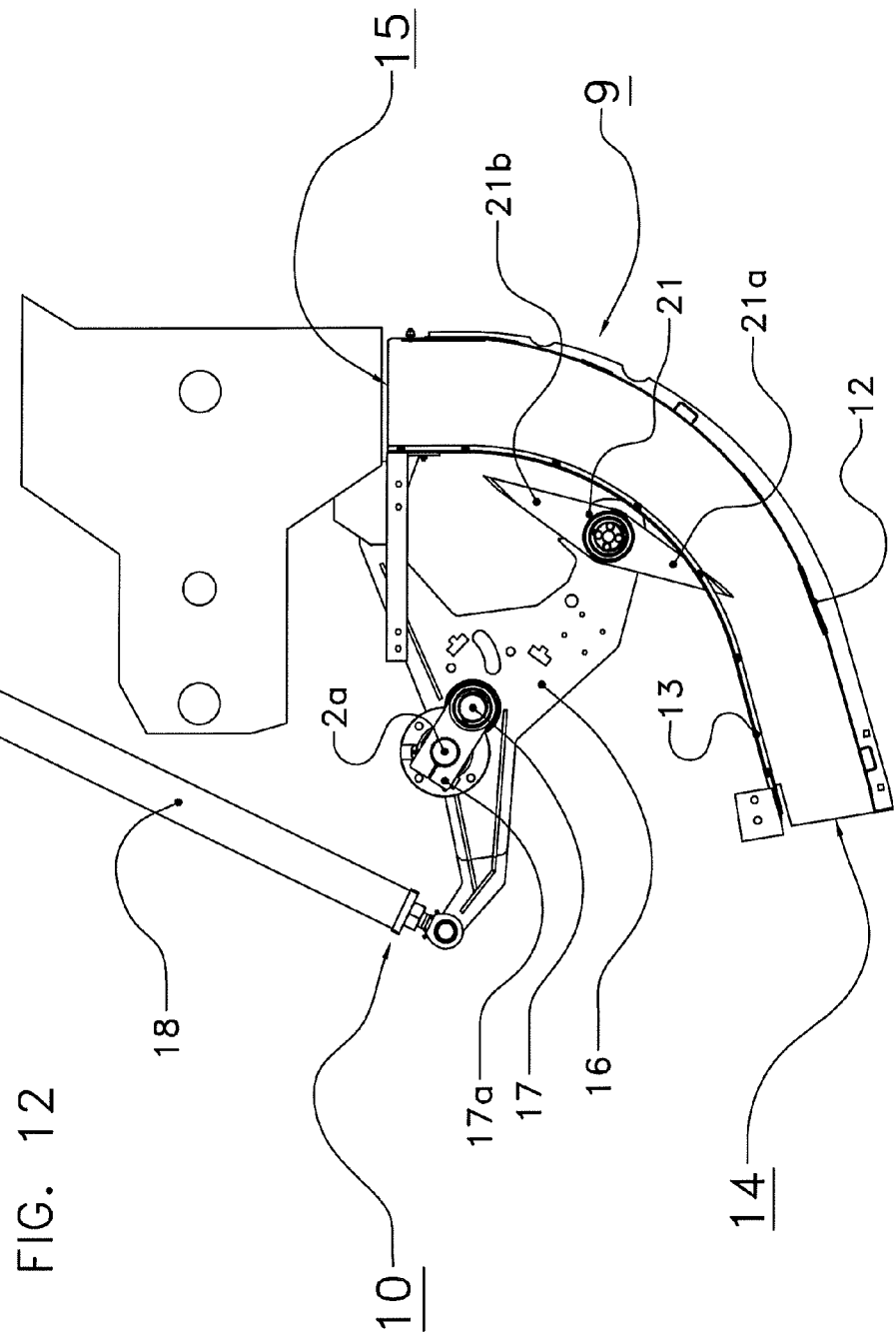

FIGS. 11 and 12 show a third alternative embodiment of a stuffing device 9 according to the invention. The same parts or parts having the same function have been indicated by the same reference numerals.

In this embodiment, the tines 21 are rotationally mounted on the tine arm 16. The tines 21 comprise a first set of tine ends 21a extending in a first direction, and a second set of tine ends 21b extending in a second direction, whereby the angle between the first set of tine ends 21a and the second set of tine ends 21b is about 180 degrees.

An actuator is provided to rotate the tines 21 when required. The tines 21 are rotated clockwise. The tines 21 can be positioned in an extended position, as shown in FIG. 11, and a retracted position, as shown in FIG. 12. The angle between the extended position and the retracted position is about 90 degrees.

The combination of movement of the crank mechanism 18 and rotation of rotation element 17a provides a continuous cyclic movement of the tine arm 16 similar to the embodiments of FIGS. 2-10.

When a complete cycle of the tine arm 16 is made in the extended position, one of the sets of tine ends 21a, 21b will be moved through the feed passage 11 and follow a load trajectory. By positioning the tines 21 in the retracted position, the tine ends of both sets of tine ends 21a, 21b can be kept substantially out of the feed passage 11. Thus, during the movement of the tines from the inlet 14 to the outlet 15 of the feed passage 11, a movement of the tines 21 from the extended position to a retracted position by rotation of the tines over an angle of substantially 90 degrees results in a stuffing trajectory.

The location where this movement from extended position to retracted position is made, can be varied dependent on the desired stuffing trajectory. During the return movement from the outlet 15 to the inlet 14, the tines 21 can again be rotated over an angle of substantially 90 degrees to return to an extended position. However, as a result of the clockwise rotation, the other of the set of tine ends 21b, 21a now extends towards the feed passage 11. A number of stuffing trajectories can be made by rotation of the tine ends during the movement from inlet 14 to outlet 15 until the feed passage 11 is sufficiently filled. During these stuffing cycles the set of tine ends 21a, 21b will alternately be used to stuff crop material in the feed passage 11.

Once the feed passage 11 is sufficiently filled a loading cycle can be started to load the stuffed crop material from the feed passage 11 into the bale chamber 6. During the whole load cycle, the tines 21 are held in the extended position so that the crop material is pushed out of the feed passage 11. Thereafter, one or more stuffing cycles can follow for stuffing a new quantity of crop material in the feed passage 11.

Figure 13:
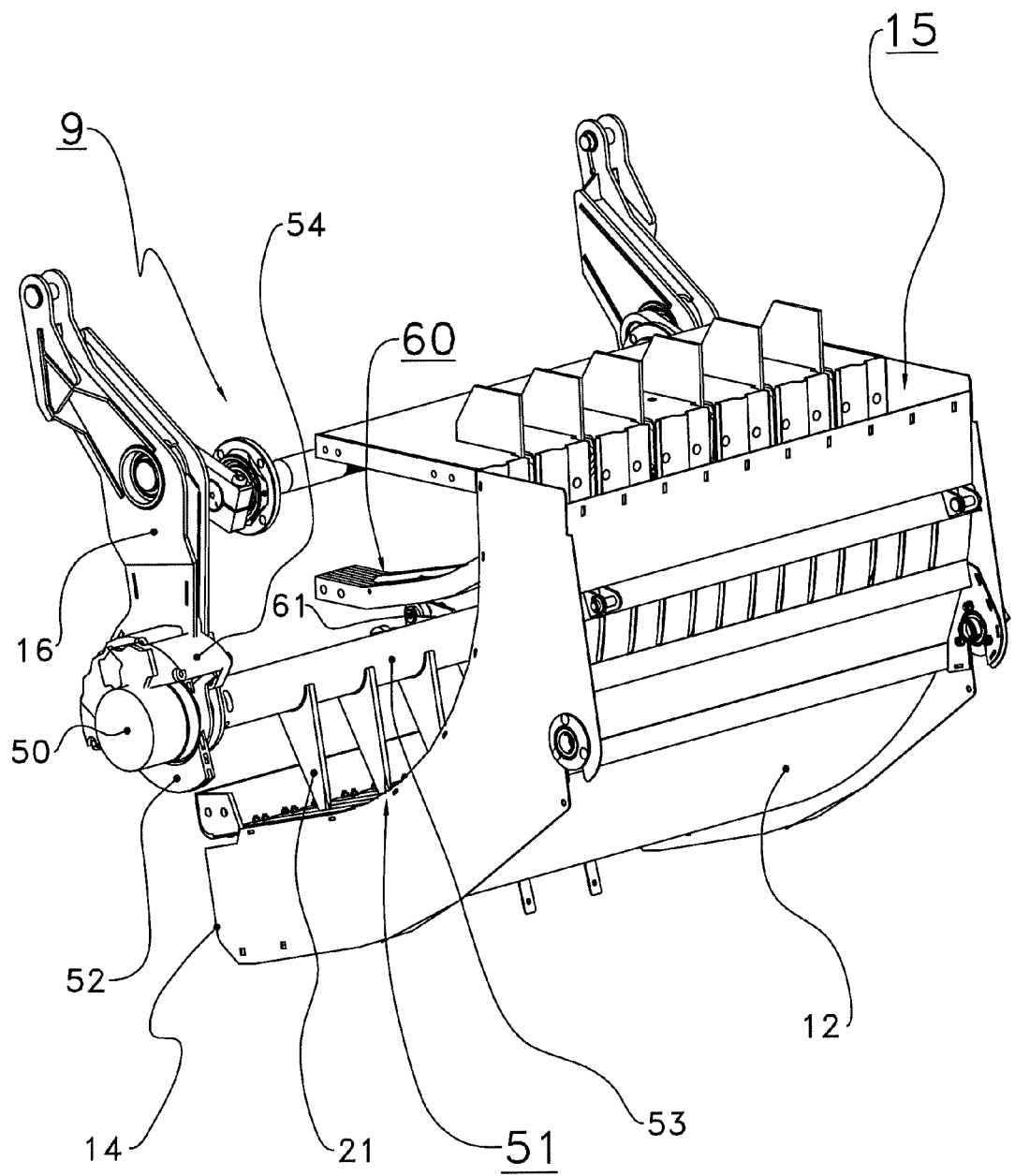
FIG. 13 shows a perspective view of the first embodiment of the stuffing device of FIG. 2 with an alternative locking device according to the invention.
Figure 14:
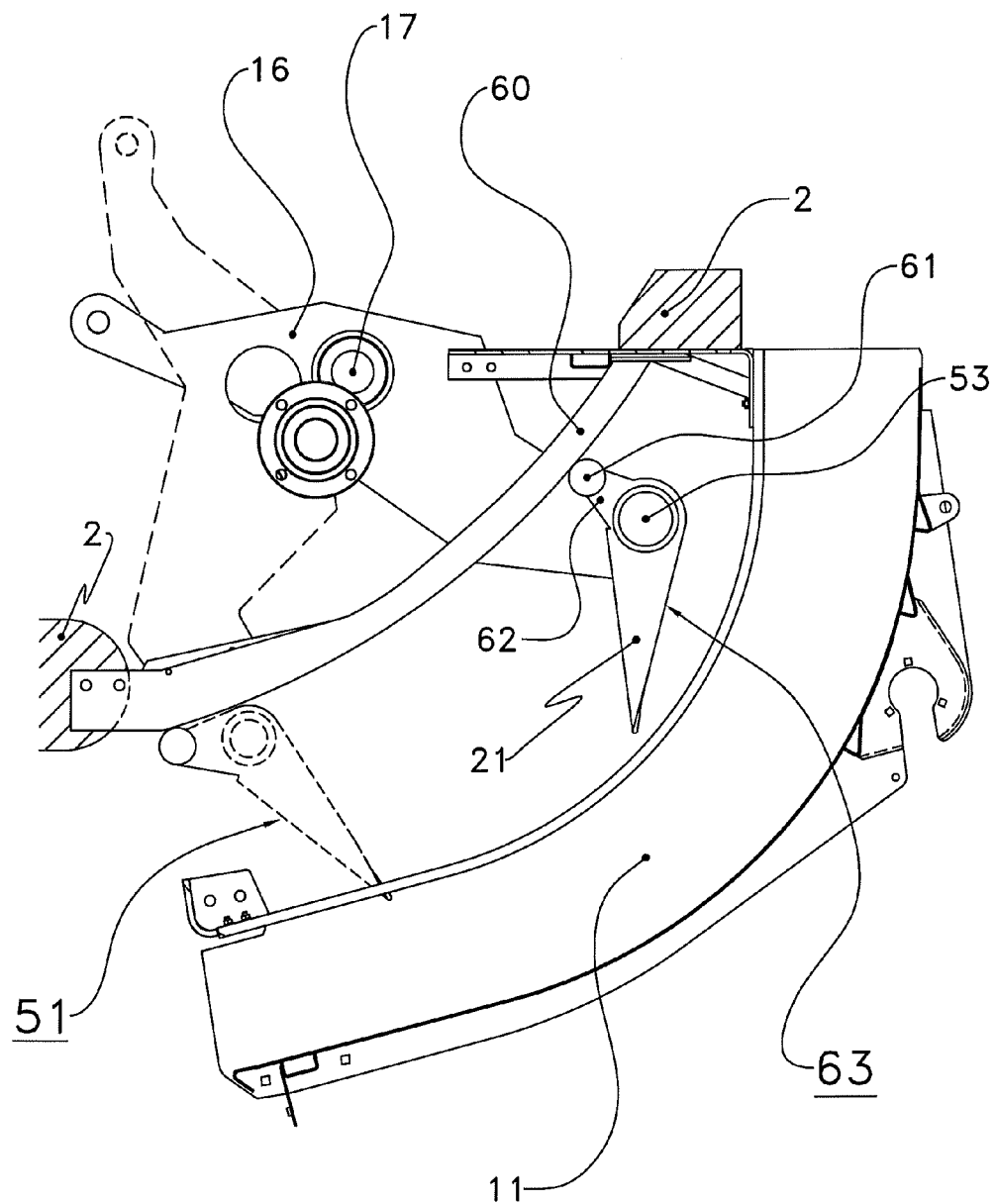
FIGS. 14 and 15 show in side view the stuffing device of FIG. 13.
Figure 15:
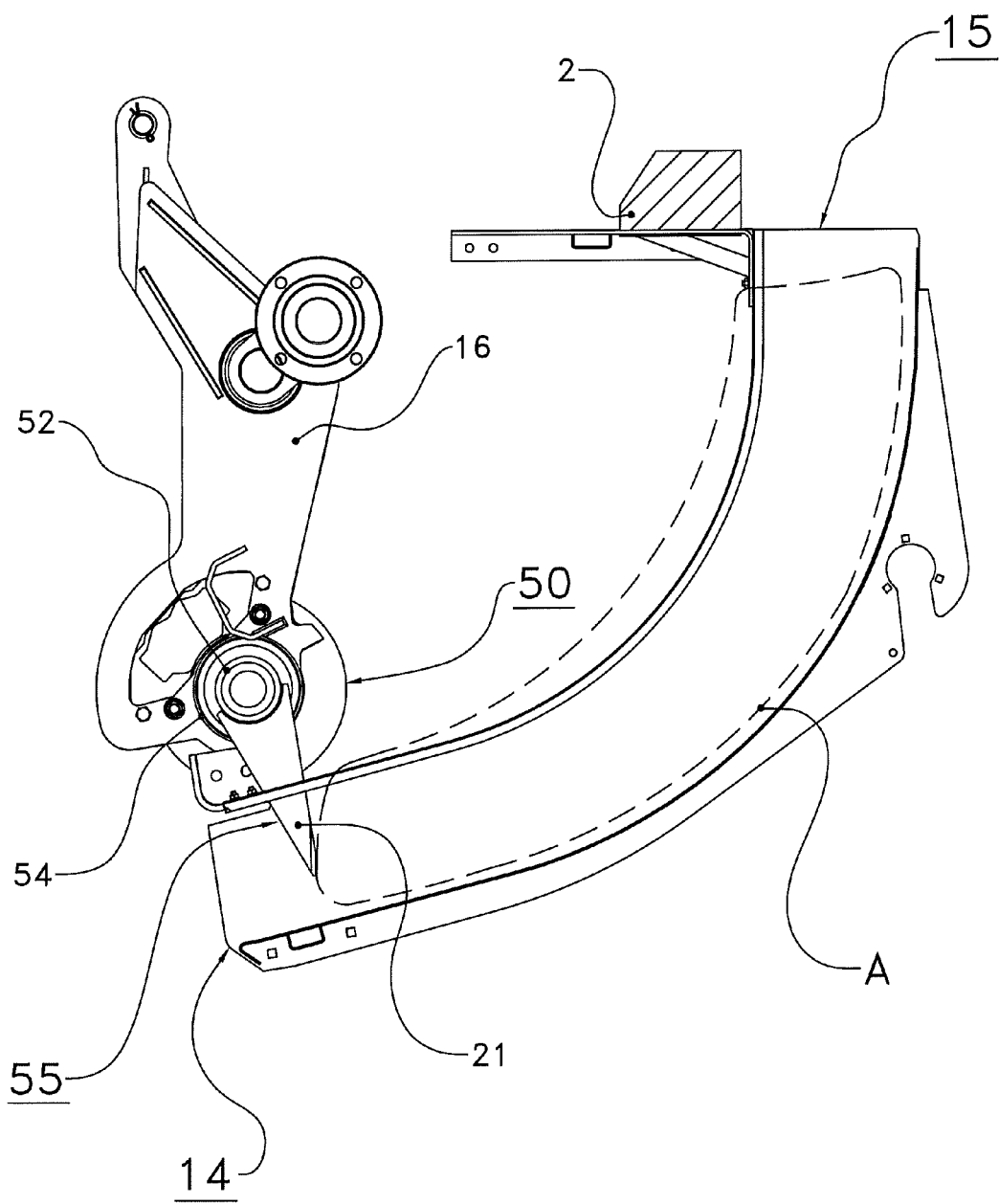

FIGS. 13-15 show an alternative embodiment of a locking device 50 of the stuffing device 9 according to the invention. The same parts or parts having the same function have been indicated by the same reference numerals.

From these views it is clear that the tine locking device 24 of FIG. 2 is replaced by a brake 50 which is arranged between the tine arm 16 and the tines 21 and moves together with the tine arm 16.

The brake 50 may be a disc brake as shown. The brake disc 51 is fixed to a tine cross beam 52 and a calliper 53 is fixedly mounted on the tine arm 16. Other known configurations are possible such as for example a drum brake or magnetic brake.

The brake 50 is activated/deactivated and closed/opened hydraulically, pneumatically or electrically.

The piston bale press comprises not shown control means configured to open/close the brake 50 on the basis of one or more parameters. The brake 50 can also be configured as an overload device in connection with a not shown force or torque sensor.

A torsion spring 54 is provided between the cross beam 52 and the tine arm 16.

FIG. 14 shows the tines 21 during a stuffing trajectory B. At the beginning of the feed passage 11 the tines 21 are locked by the brake 50 in an extended position 55. During further movement of the tines 21 in direction of the arrow 56 the brake 50 is unlocked at point 57 of the trajectory B and the tines 21 are free to move from the extended position 55 to the retracted position 58 shown in dashed lines.

The swivel movement of the tines 21 is caused by the pre-compressed material in the feed passage 11 increasing the tension of the spring 54. The brake 50 is deactivated during the return movement of the tines 21 along the stuffing trajectory B and reactivated at a point 59 when the tines 21 have been moved in the extended position 55 due to the force of the spring 54. A new stuffing cycle or a loading cycle starts-depending on the tine force or another parameter.

FIG. 15 shows a load trajectory A with tines 21 in extended position 55 locked by the brake 50 during the whole cycle. The brake 50 can also be applied in the third embodiment of the stuffing device of FIGS. 11 and 12.

Figure 16:
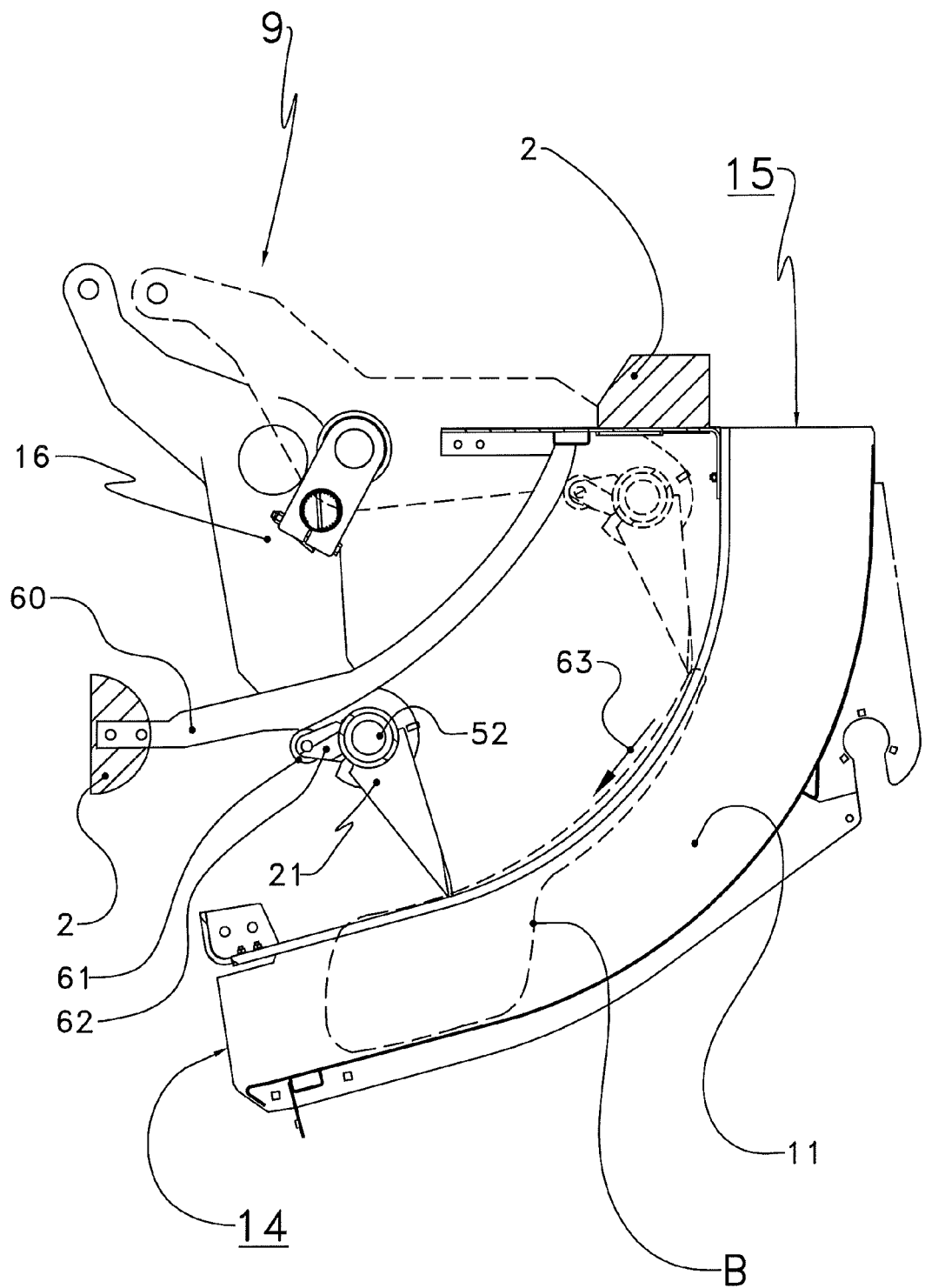
FIGS. 16 and 17 show in side view the first embodiment of the stuffing device of FIG. 2 with an alternative biasing element.
Figure 17:
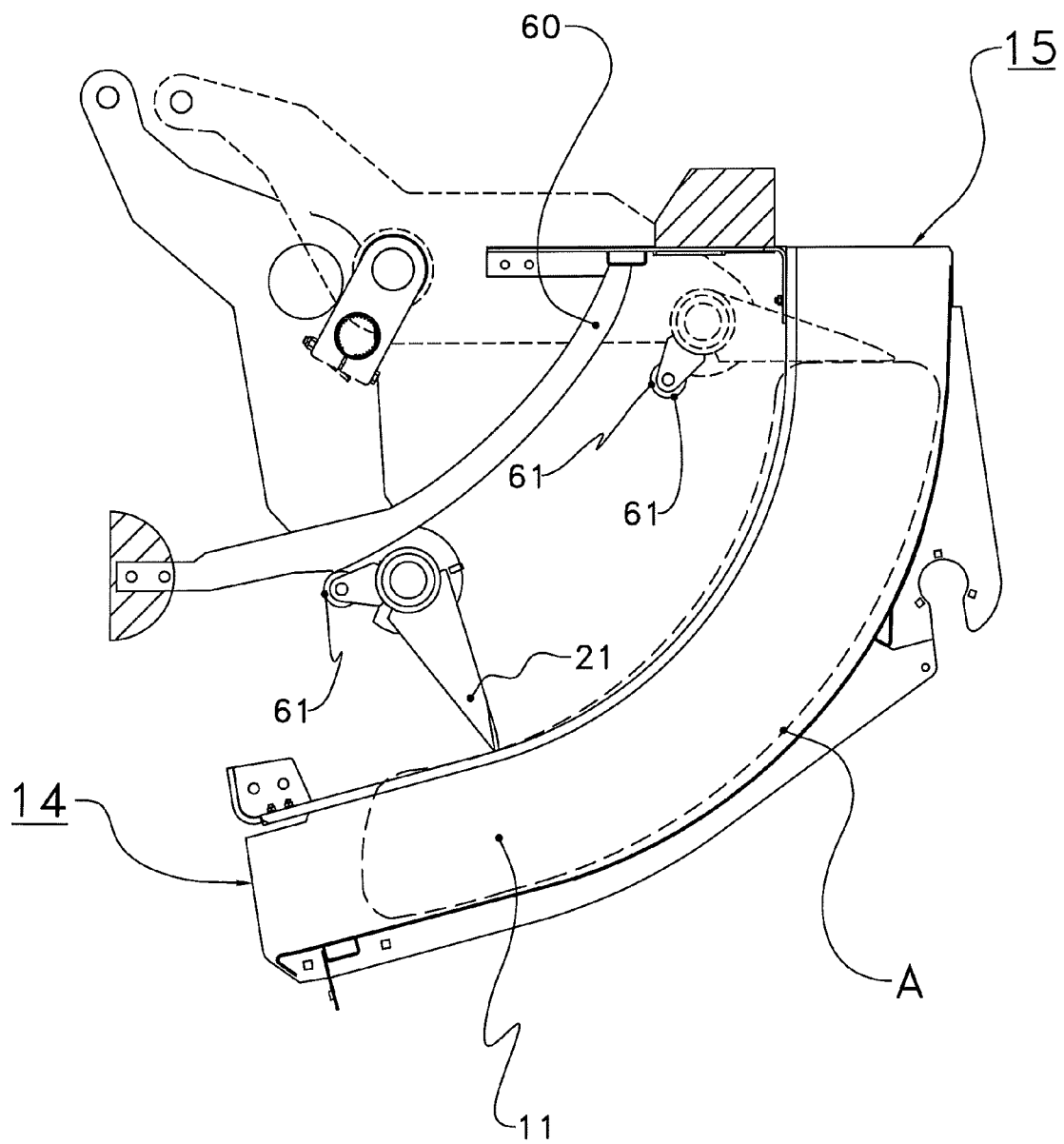

FIGS. 16 and 17 show an alternative embodiment of a biasing element 60 of the stuffing device 9 according to the invention. The same parts or parts having the same function have been indicated by the same reference numerals.

In this embodiment the spring to bias the tines 21 in the extended position is replaced by a cam track 60 and a cam roller 61 or follower on the tines 21. The cam track 60 is fixedly mounted to the frame 2 of the piston bale press and is arranged in the free room above the feed passage 11 and between the tine arms 16. The cam track 60 is formed as a rail curved according to the return movement of the tine pivot 21a along trajectory X, see FIG. 2, and extends from the inlet 14 to the outlet 15 and above the return trajectory of the tine crossbeam 52.

In FIGS. 16 and 17 there is only provided one cam track 60 which is arranged in the middle between the two tine arms 16. The cam roller 61 assigned to the cam track 60 is rotatably mounted on an arm 62 fixed to the cross beam 52 at the middle between the tine arms 16. The axis of the roller 61 is radially offset from the axis of the tine cross beam 52.

The mechanical arrangement of the cam track 60 and the cam roller 61 is clear in detail from FIGS. 16 and 17.

FIG. 16 shows the stuffing device 9 during movement of the tines 21 along a stuffing trajectory B. The arrangement of the cam roller 61 with respect to the cam track 60 is so selected that the cam track 60 comes into contact with the cam roller 61 in the outermost retracted position of the tines 21 shown in dashed lines. During the return movement of the tines 21 in direction of the arrow 63 towards the inlet 14 the tines 21 are brought back by the cam track 60 to the extended position in order to start a new stuffing or load cycle.

In FIG. 17 the arrangement is shown during movement of the tines 21 along a load trajectory A, in which the tines 21 are locked in extended position. The cam roller 61 comes only in contact with the cam track 60 at the end of the return movement of the load trajectory A shortly before entering of the tines 21 into the feed passage 11 while the tines 21 in the in dashed line shown extended position are not actively controlled by the cam track 60 at the begin of the return movement of the tines 21 near the outlet 15, see distance between cam roller 61 and cam track 60.

Two not shown cam tracks can be alternatively provided at opposite sides of the piston bale press interacting with a cam roller at both ends of the tine cross beam 52.

The cam track can also be movable and/or spring loaded in order to influence the angle of the tines 21 under which they enter into the feed passage 11 at the end of the return movement of the stuffing cycle near the inlet 14. The cam track can also be sectionized in segments with different gradients. An individual cam roller may be assigned to each segment.

Figure 18:
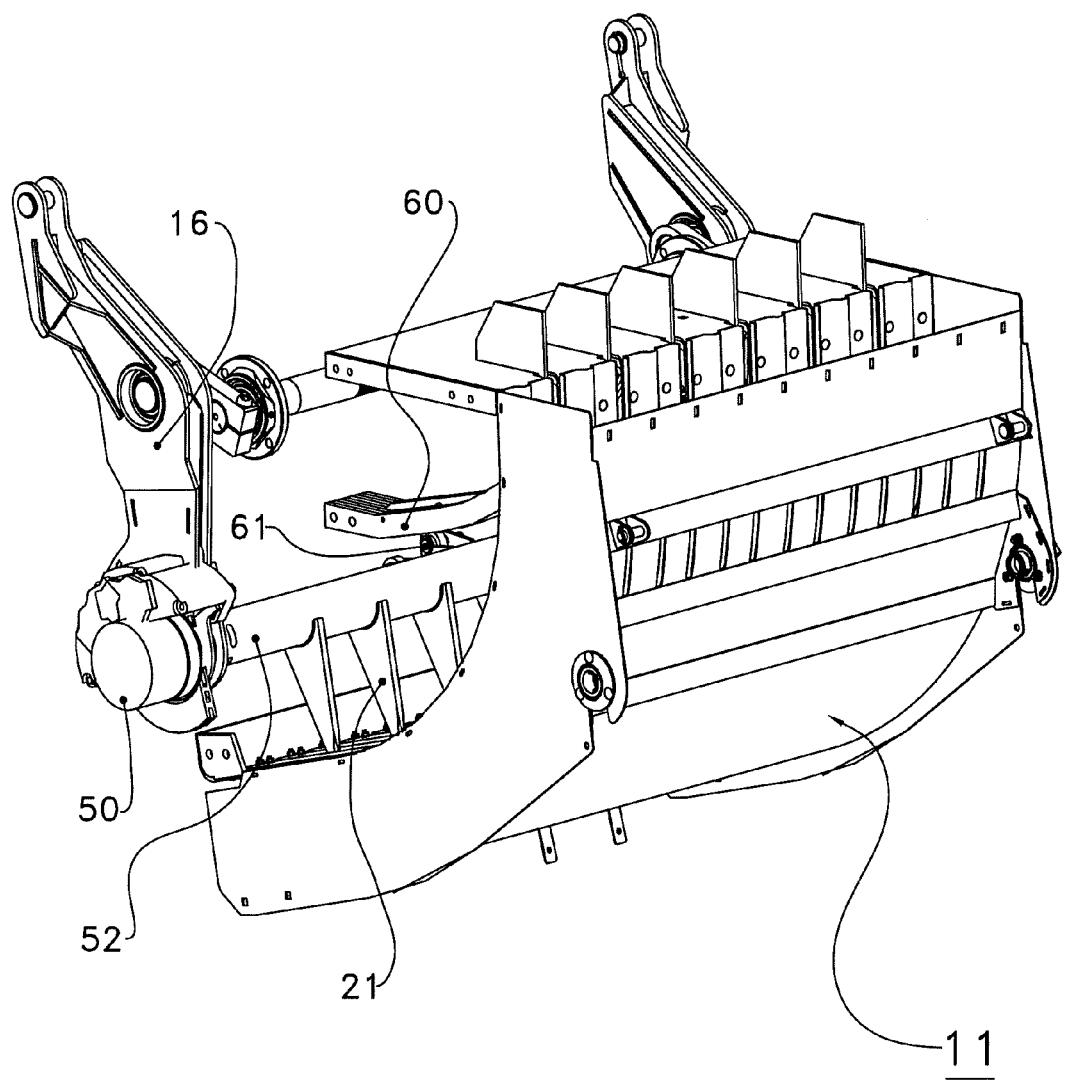
FIG. 18 shows in perspective view the stuffing device of FIG. 2 with the alternative locking device of FIGS. 13-15 and the alternative biasing element of FIGS. 16 and 17.

FIG. 18 shows in perspective view an alternative embodiment of a stuffing device 9 with a brake 50, see FIGS. 13-15, in combination with a cam track 60, see FIGS. 16 and 17, arranged in the middle of the piston bale press. As difference and advantage of this combination there is no need for a spring to move the tines 21 from the retracted to the extended position.

On the load trajectory A, see FIG. 17, the brake 50 is activated and locks the tines 21 during the full cycle.

During the forward movement of the tines 21 along the stuffing trajectory B, see FIG. 16, the brake 50 is deactivated depending on the force or pressure exerted on the tines 21 or the retaining element 30 and the tines 21 are free to move into the retracted position. On the return movement the tines 21 are moved by the cam track 60 from the retracted position, in which the brake 50 is deactivated to the extended position, in which the brake 50 is reactivated.

The moment of carrying out a complete load cycle may again be dependent on the force or pressure exerted on the tines 21 or the retaining element 30 or, for instance the number of subsequent stuffing cycles. At the same moment, the retaining element (not shown) will be moved from the retaining position to the open position.

Hereinabove, a mechanism comprising a crank mechanism 18 and a rotation drive for driving the pivot axis 17 in a rotational movement has been described for obtaining a continuous cyclic constant movement of the tine arm 16. However, any other mechanism configured to move the tine arm 16 in a cyclic constant movement may also be applied without departing the scope of the invention.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An agricultural piston bale press, comprising:
   a pressing piston arranged in a bale chamber to form bales of crop material;
   a main drive mechanism to drive the pressing piston;
   an intake device to take in crop material, and
   a stuffing device to stuff crop material taken in by the intake device and to load the stuffed crop material to the bale chamber,
   wherein the stuffing device comprises a feed passage and a stuffing mechanism, the stuffing mechanism comprising a tine arm supporting tines, which tines can be moved along at least one stuffing trajectory to stuff crop material in the feed passage, and a drive mechanism to drive the tine arm,
   wherein the drive mechanism is configured to move the tine arm in a cyclic movement along a constant trajectory, the tines being movably supported on the tine arm by a pivotal connection so that the tines are arranged in different positions with respect to the tine arm to follow different trajectories, and wherein the stuffing mechanism comprises a tine locking device, wherein the tine locking device has a locked position to lock the tines in a loading position and an unlocked position wherein the tines are freely movable with respect to the tine arm.

2. The agricultural piston bale press of claim 1, wherein the tines are arranged in one or more positions to follow a stuffing trajectory and in one or more positions to follow a load trajectory to load stuffed crop material from the feed passage into the bale chamber.

3. The agricultural piston bale press of claim 1, wherein the cyclic movement of the tine arm along the constant trajectory is a continuous movement.

4. The agricultural piston bale press of claim 1, wherein the tine arm is pivotable about a first pivot axis, which first pivot axis is mounted on a rotation element, the rotation element being rotatable about a second pivot axis mounted on the frame.

5. The agricultural piston bale press of claim 1, wherein the stuffing mechanism is configured to move the tines between an extended position and a retracted position with respect to the tine arm during the stuffing trajectory.

6. The agricultural piston bale press of claim 1, wherein the stuffing mechanism comprises a biasing element to bias the tines in the loading position.

7. The agricultural piston bale press of claim 6, wherein the biasing element comprises a spring arranged between the tine arm and the tines and at least one cam track arranged between the tines and the frame.

8. The agricultural piston bale press of claim 1, wherein the tines are pivotably supported on the tine arm.

9. The agricultural piston press of claim 1, wherein, during a stuffing cycle, the tine locking device is arranged in the unlocked position, and wherein crop material in the feed passage pushes the tines out of the loading position to move the tines along the stuffing trajectory.

10. The agricultural piston press of claim 9, wherein the stuffing mechanism comprises a biasing element to bias the tines in the loading position wherein the biasing element comprises a spring arranged between the tine arm and the tines and at least one cam track arranged between the tines and the frame.

11. The agricultural piston bale press of claim 1, further comprising a linear actuator and a linear guiding device, so that the tines are translatable in a longitudinal direction of the tine arm.

12. The agricultural piston bale press of claim 1, wherein the tines are rotationally mounted on the tine arm, wherein the tines comprise a first set of tine ends extending in a first direction with respect to a mounting location on the tine arm, and a second set of tine ends extending at a different angle with respect to the mounting location, wherein the tine ends are alternatively used for stuffing and loading of crop material.

13. The agricultural piston bale press of claim 1, wherein the stuffing device is configured to move the tines along two or more stuffing trajectories.

14. The agricultural piston bale press of claim 1, wherein the position of the tines with respect to the tine arm is controlled directly or indirectly on the basis of a force exerted on the tines, a position of the tines with respect to the tine arm, a location of the tines on the constant trajectory and a pressure exerted on the crop material in the feed passage.

15. The agricultural piston bale press of claim 1, wherein the tines are arranged in one or more positions to follow a stuffing trajectory or in one or more positions to follow a load trajectory to load stuffed crop material from the feed passage into the bale chamber.

16. The agricultural piston bale press of claim 6, wherein the biasing element comprises a spring arranged between the tine arm and the tines, or and at least one cam track arranged between the tines and the frame.

17. The agricultural piston press of claim 9, wherein the stuffing mechanism comprises a biasing element to bias the tines in the loading position wherein the biasing element comprises a spring arranged between the tine arm and the tines, or at least one cam track arranged between the tines and the frame.

18. The agricultural piston bale press of claim 1, wherein the tines are rotationally mounted on the tine arm, wherein the tines comprise a first set of tine ends extending in a first direction with respect to a mounting location on the tine arm, and a second set of tine ends extending at a different angle with respect to the mounting location, wherein the tine ends are alternatively used for stuffing or loading of crop material.

19. The agricultural piston bale press of claim 1, wherein the position of the tines with respect to the tine arm is controlled directly or indirectly on the basis of at least one of a force exerted on the tines, a position of the tines with respect to the tine arm, a location of the tines on the constant trajectory, and a pressure exerted on the crop material in the feed passage.

* * * * *